United States Patent [19]
Yamane et al.

[11] Patent Number: 5,339,319
[45] Date of Patent: Aug. 16, 1994

[54] ROTARY TYPE STORAGE APPARATUS AND CONTROL METHOD THEREOF

[75] Inventors: Yuji Yamane, Odawara; Toshimitsu Kaku, Sagamihara; Yasushi Fukuda, Odawara; Hitoshi Komatsu; Nobuhiro Matsumura, both of Kanagawa; Shigenori Okamine, Kodaira; Kiyoshi Matsumoto, Kokubunji; Soichi Isono, Yokohama; Kunihiko Kizaki, Hadano, all of Japan

[73] Assignee: Hitachi, Ltd., Tokyo, Japan

[21] Appl. No.: 724,716

[22] Filed: Jul. 2, 1991

[30] Foreign Application Priority Data

Jul. 5, 1990 [JP] Japan .................. 2-178323

[51] Int. Cl.⁵ .................. G06F 11/00; G11B 7/13
[52] U.S. Cl. .................. 371/10.2; 360/47; 360/53
[58] Field of Search .............. 371/10.1, 10.2; 360/47, 360/53

[56] References Cited

U.S. PATENT DOCUMENTS

| | | | |
|---|---|---|---|
| Re. 31,069 | 10/1982 | Chang et al. | 371/10.2 |
| 3,771,143 | 11/1973 | Taylor | 395/575 |
| 4,152,695 | 5/1979 | Democrate et al. | 371/10.2 |
| 4,434,487 | 2/1984 | Rubinson et al. | 371/10.2 |
| 4,611,314 | 9/1986 | Ogata et al. | 369/32 |
| 4,631,723 | 12/1986 | Rathbun et al. | 371/10.2 |
| 4,706,136 | 11/1987 | Wentzel et al. | 360/39 |
| 4,984,230 | 1/1991 | Satoh et al. | 369/54 |
| 5,216,655 | 6/1993 | Hearn et al. | 369/58 |

*Primary Examiner*—Charles E. Atkinson
*Attorney, Agent, or Firm*—Fay, Sharpe, Beall, Fagan, Minnich & McKee

[57] ABSTRACT

In a rotary type storage apparatus and a control method thereof, a plurality of concentric or spiral information tracks are set and also each of the plural information tracks is subdivided into a plurality of sectors along a circumferential direction, which constitute a plurality of information recording planes. Also, in this apparatus and method, there are provided a plurality of read/write heads employed at each of the information recording planes and accessible to the information tracks, and also a head drive mechanism for positioning these plural read/write heads to the information tracks. At least one of the plural information recording planes corresponds to such a recording plane where a substitution information track has been set, on which a substitution sector corresponding to a failed sector present at another information recording plane is recorded.

6 Claims, 13 Drawing Sheets

DATA READ

FIG. 6 DATA WRITE

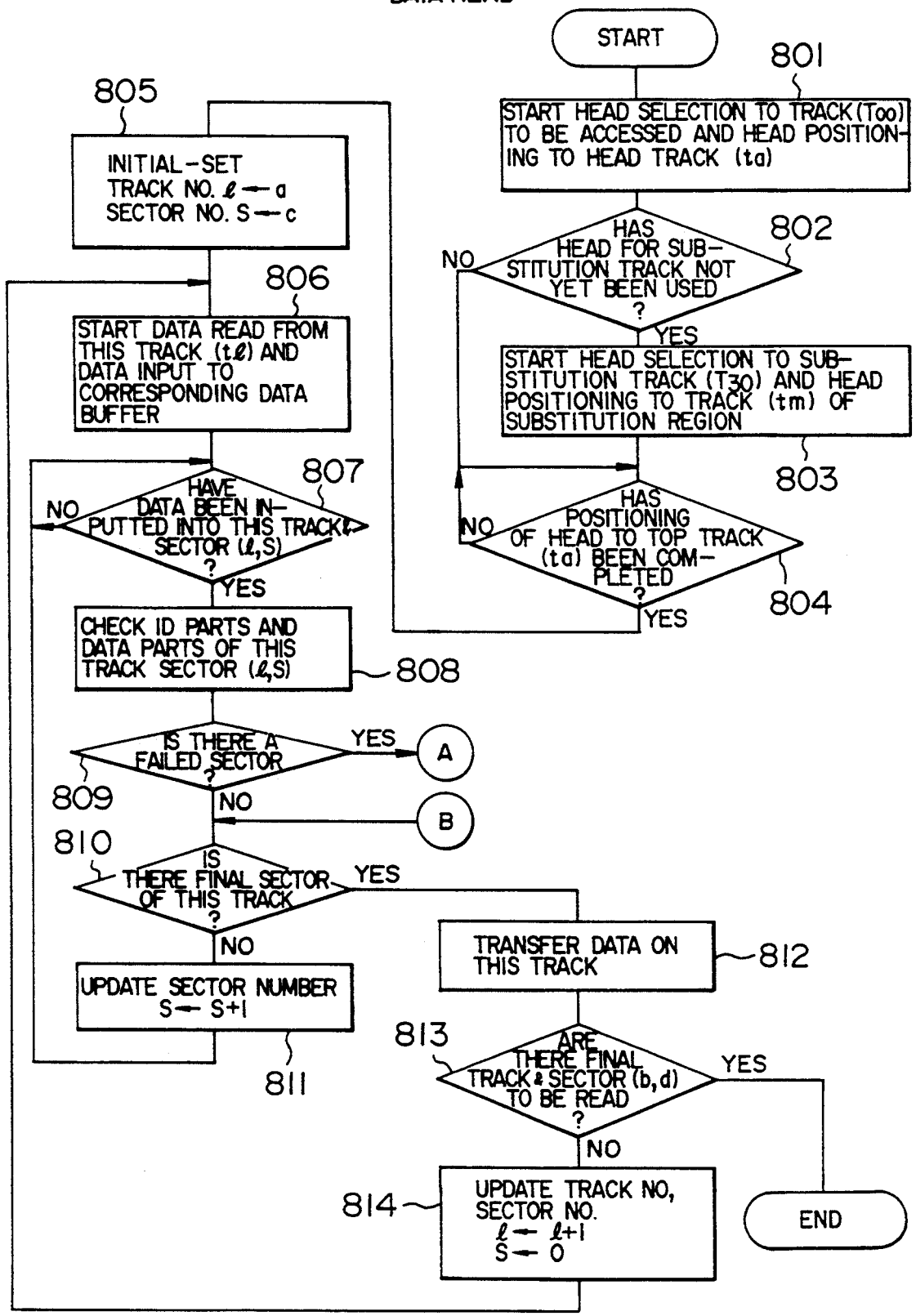

DATA WRITE

ROTARY TYPE STORAGE APPARATUS AND CONTROL METHOD THEREOF

BACKGROUND OF THE INVENTION

The present invention relates to a rotary type storage apparatus and a control technique thereof, and more specifically, to a rotary type storage apparatus and a control method thereof effectively applied to a rotary type storage apparatus or the like, for transferring data on a plurality of information tracks between a high order apparatus and the storage apparatus.

In conventional well known magnetic disk storage apparatuses and optical disk apparatuses used as external storage apparatuses for computer systems, a pair of data read/write heads (for instance, magnetic heads and optical heads) are selected so as to perform a data transfer operation for each information track.

More recently, performance of central processing units (CPU) of high order apparatuses and channel apparatuses for controlling data transmission and reception with respect to external apparatuses has rapidly improved, especially data processing speed. In connection therewith, performance (in particular, data transferring speed) of the external storage apparatuses such as the magnetic disk storage apparatus and the optical disk apparatus needs to be similarly improved.

Accordingly, a method has been proposed in, for instance, a magnetic disk storage apparatus that a plurality of magnetic heads commonly driven by a single access mechanism are simultaneously driven to transfer data on a plurality of information tracks at the same time. Furthermore, there is FBA (Fixed Block Architecture) type magnetic disk storage apparatus in which the recording unit of the data on the information track is selected to be a fixed length. In such external storage apparatuses, high speed data transfer operations containing the substitution (replacement) process for defects made on the recording medium are required.

Under such circumstances, in such a sort of rotary type information storage apparatus, generally speaking, the following substitution processing method has been employed. That is, the substitution sector regions corresponding to several sectors are reserved at the rear ends of the respective information tracks. In case that there is a recording medium defect at a certain sector of a certain track, the substitution sector of this sector is allocated to the above-described sector region on the same information track. When the regions containing the failed (defect) sector are read out, useless rotation waiting time is required for accessing the substitution sector into which the content of this failed sector has been stored. Accordingly, there is such a problem that input-/output response time is considerably increased.

As a consequence, another conventional substitution processing method has been proposed that no useless rotation waiting time is required to read out the regions containing the failed sector. For instance, as described in JP-A-62-6243169, within the subsequent information track in the same cylinder of the information track belonging to the failed sector, the sector positioned at the same position as the failed sector in a circumferential direction of the recording medium is allocated as the substitution sector, and also when the failed sector belongs to the final track, the sector present in the head track at the position subsequent to the position of the above described failed sector is substituted as the substitute sector.

In FIG. 1, there is shown one example of the FBA type magnetic disk storage apparatus to which the above-described substitution processing method has been applied.

FIG. 1 represents a track format, and formats of 4 tracks ($t_0$, $t_1$, $t_2$, $t_3$) are identical to each other. It should be noted that although FIG. 1 shows a 4-track arrangement for the sake of convenience, the track arrangement is not limited thereto, generally speaking. Each of the tracks starts from an index signal 202, and is subdivided into (N+1) pieces of sectors 203 (0, 1, 2, ---, N). A single block 204 ($B_{00}$, $B_{01}$, $B_{02}$,---, $B_{0N}$, $B_{10}$, $B_{11}$, ---, $B_{3N}$) is allocated to each of the sectors, and then both the data transfer operation between the high order apparatus and the storage medium, and the data read/write operation on the magnetic disk are carried out in units of this block. Also, one magnetic head is employed with each of these tracks, and four blocks (for instance, $B_{00}$, $B_{10}$, $B_{20}$, $B_{30}$) on the same sectors along the circumferential direction may be simultaneously read and written. It should be noted that each of the blocks is constructed of an ID part 205 on which the physical address (for example, track number, sector number) of this block has been recorded, and also a data part 206 on which the actual user data are recorded.

In general, since the data on the same sectors of the plural tracks along the circumferential direction are parallel-transferred one by one, the theoretical block transfer sequence is set to $B_{00}$, $B_{10}$, $B_{20}$, $B_{30}$, $B_{01}$, $B_{11}$, ---, $B_{2N}$, $B_{3N}$. Furthermore, four blocks (for instance, $B_{00}$, $B_{10}$, $B_{20}$, $B_{30}$) of the tracks "$t_0$" to "$t_3$" at the same sector position (e.g., sector "0") are simultaneously read out, and the read blocks are once read into the data buffer in the magnetic disk storage apparatus. Then, while 4 blocks (for example, $B_{01}$, $B_{11}$, $B_{21}$, $B_{31}$) at the next sector position (e.g., sector 1) are read out and read into another data buffer, the previous 4 blocks ($B_{00}$, $B_{10}$, $B_{20}$, $B_{30}$) stored in the above-described data buffer are transferred to the high order apparatus. The above-described block processing operation is subsequently repeated. The order of the blocks transferred to the high order apparatus is determined, as previously stated, in the order of the tracks $B_{00}$, $B_{10}$, $B_{20}$, $B_{30}$, $B_{01}$, $B_{11}$, ---.

In general, according to the above-described method, if the data transfer capability of the high order apparatus (namely, channel apparatus) is "n" times higher than that of a single magnetic disk when the track number is "n", it is possible to transfer data consisting of "n" sectors while the magnetic head is advanced by 1 sector. Then, the effective data transfer velocity of the magnetic disk storage apparatus becomes "n" times higher than the data transfer speed achieved when the data are transferred trackwise.

Subsequently, in the conventional storage apparatus shown in FIG. 1, consideration is given to the defect produced in the recording medium, since when, for example, the block $B_{20}$ of the sector "0" at the track "$t_2$" becomes a failed sector, the data (2) to be written into this block $B_{20}$ have been recorded on the block $B_{30}$ at the same sector of the subsequent track "$t_3$", the data (2) may be read out therefrom without any useless rotation waiting time. When the block $B_{31}$ of the sector 1 in the final track "$t_3$" becomes a failed sector, as the data (6) to be written into this block $B_{31}$ have been recorded on the block $B_{02}$ of the next sector in the track "$t_0$", this data (6) may be read out, while waiting for 1 sector rotation time.

On the other hand, there is an optical disk as an information storage medium having a large memory capacity at lower recording cost, suitable for recording/reproducing a large quantity of data such as image information and document information. Since the present reliability of the data writing operation for such an optical disk is not sufficient, it is therefore required to maintain the reliability of the recorded data by simultaneously performing the readout check by the DRAW (Direct Read After Write) operation when the data are written into the optical disk. However, to allocate the substitution sector corresponding to the sector which has been judged as the failed sector by this DRAW operation, at least one sector just after this failed sector needs to be used. In accordance with the conventional technique as described in the above JP-A--62-243169, the substitution sector must be allocated at the same sector of the next track with respect to the failed sector, whereby it may be understood that the substitution process effected by the DRAW operation cannot be realized. As a result, if the above-described DRAW operation is applied to the above-described conventional techniques, the data cannot be written at the same time, and thus the readout check by the DRAW operation must be performed while sequentially writing the data while waiting for the respective disk rotations in unit of 1 sector in the order of the track. Then, there is a problem that the data writing velocity is considerably lowered.

Very recently, in the magnetic disk storage apparatus and optical disk storage apparatus, a data plane servo system has been widely utilized as the positioning method of the read/write head. In the conventional magnetic disk storage apparatus, the track on at least a certain plane of the disk is used as the servo track, and in connection with the positioning operations of a pair of read/write heads to this servo track, other read/write heads are positioned to the track on other disk plane. In accordance with the above-described data plane servo system, the information (for instance, address information such as track numbers and sector number) required for the positioning operation has been previously written on the respective tracks, so that the positioning operations may be separately performed in unit of each head. As a consequence, there are advantages that the distance between the adjoining tracks may be made very short and the memory capacity may be increased. In the above-described data plane servo type magnetic disk storage apparatus or optical disk storage apparatus, if the head drive mechanism capable of separately driving a plurality of tracks is employed, a plurality of tracks may be accessed in a parallel mode without mutual relationships. In this case, since the operations of the respective heads are not in synchronism with each other, the above-described substitution processing method as disclosed in the above-described Japanese patent KOKAI disclosure for the failed sector cannot be employed. Also, there is another problem in the access time to the common substitution sector region (namely to which a specific track on the disk plane has been allocated) when the substitution sectors consisting of several sectors are completely used in accordance with such a conventional method that several sectors are employed at the rear end of each track.

SUMMARY OF THE INVENTION

In the conventional art as described in the above-described Japanese patent KOKAI disclosure, when the data stored in the regions containing the failed sector are read out from the magnetic disk, or when the data are written into the regions containing the failed sector under condition that the position of this failed sector is already known, no useless rotation waiting time is produced. Then, if a storage medium such as an optical disk having a lower data recording reliability is utilized by way of the above-described conventional technique, such a complex recovery process is required that when a failed sector is detected during the data writing operation, after the optical disk has been rotated by one rotation, a sector of the next track present at the same position as the failed sector is allocated to a substitution sector, and then the data are again written in sectors subsequent to this sector. As a consequence, there is a problem in the above-described prior art that when the failed sector happens to occur during the data writing operation, the effective data transfer velocity is extremely lowered.

Therefore, an object of the present invention is to solve the problems belonging to the above-described conventional techniques, and to provide a rotary type storage apparatus capable of suppressing occurrences of useless rotation waiting time during the substitution process for failed sectors, and also of improving an effective transfer velocity of parallel data transfer operation executed between a plurality of information tracks and a high order apparatus.

Another object of the present invention is to provide a rotary type storage apparatus capable of suppressing occurrences of useless rotation waiting time during the substitution process for the failed sectors, and also of improving effective transfer velocities of data transfer operations which are performed in a parallel mode and in asynchronism with each other between a plurality of information tracks and a plurality of high order apparatuses.

A further object of the present invention is to provide a control method for a rotary type storage apparatus capable of suppressing occurrences of the useless rotation waiting time during the substitution process for the failed sectors, and also of increasing an effective transfer velocity of parallel data transfer operations between a plurality of information tracks and a high order apparatus.

That is to say, a rotary type storage apparatus according to the present invention, comprises: a rotary type storage medium to which a plurality of concentric or spiral information tracks are set, and having a plurality of information recording planes in which each of said plurality of information tracks is subdivided into a plurality of sectors along a circumferential direction; a plurality of heads provided with each of said information recording planes and for accessing said information tracks; and, a head drive mechanism for controlling positioning operations of heads to said information tracks in which at least one of said plurality of information recording planes is used as a recording plane on which a substitution information track has been set, in which a substitution sector corresponding to a failed sector present at another information recording plane is recorded.

Also, a control method of a rotary type storage apparatus, according to the present invention, comprising: a rotary type storage medium to which a plurality of concentric or spiral information tracks are set, and having a plurality of information recording planes in which each of said plurality of information tracks is subdivided into a plurality of sectors along a circumferential direction; a plurality of heads provided with each of said information recording planes and for accessing said information tracks; and, a head drive mechanism for controlling positioning operations of the heads to said information tracks; in which a plurality of data buffers and read/write control circuits are separately employed with the respective heads, and data transfer operations are performed in a parallel mode between a plurality of information tracks and data buffers.

In accordance with the rotary type storage apparatus and the control method according to the present invention, for instance, a plurality of data buffers and read/write control circuits are independently provided with each of the heads. In such an arrangement that a plurality of data read/write heads are mutually operated, the storage apparatus is operated as follows.

That is, during the data reading operation, blocks on an i-th sector are read into the corresponding data buffer in which all of the information tracks (including the substitution information tracks) are simultaneously read, and thereafter blocks on a next (i+1)th sector are continuously read therein. A judgement is made whether or not each of the data written into the data buffer corresponds to data on a failed sector in the order of the read blocks. In case of the data on the normal sector, the above-described data buffers are selected in the order of the address of the information tracks so as to pick up these blocks one by one. In other words, the data are transferred to the high order apparatus in the order of a track "0" at the i-th sector; a track "1" at the i-th sector; ---, a track "n" at the "i-th" sector; a track "0" at the (i+1)-th sector;—, a track "n" at the (i+1)-th sector. When, for instance, a judgement is established that the track "1" at the i-th sector corresponds to the failed sector, instead of such a selection of the data buffer for the track "1" at the i-th sector, the block (assuming that this substitution sector is normal) corresponding to the (i+1)-th sector of the data buffer of the substitution information track is selected.

During the data writing operation, the data which have been transferred from the high order apparatus are subdivided into blocks in units of a single block, and then written by selecting the data buffers in the order of the addresses of the information tracks. In other words, the data are written into the respective data buffers in the order of the track "0" at the i-th sector; the track "1" at the i-th sector;—, the track "n" at the i-th sector; the track "0" at the (i+1)-th sector; the track "1" at the (i+1) -th sector;—; the track "n" at the (i+1) -th sector. The data stored within the respective data buffers are sequentially read out in unit of one block, and the blocks at the same sectors are simultaneously written into all of the information tracks. Then, the readout check for, e.g., the i-th sector is carried out with respect to all of the information tracks (except for the substitution information tracks which have not yet been used) at the same time with the data writing operation.

After the readout check, a check is made whether or not the sector corresponds to the failed sector. If all of the sectors are normal, then both the writing operation and readout check are continuously carried out for the next (i+1)-th sector. If a judgement is made that, for example, the track 1 at the i-th sector corresponds to the failed sector during the above-described operation, the data corresponding to the i-th sector of the data buffer for the track 1 is are written into a position of the data buffer for the substitution information track corresponding to the (i+1)-th sector. During the data writing operation to the subsequent (i+1)-th sector, the substitution sector (substitution (i+1)-th sector) of the i-th sector of this track 1 is written, and also the readout check for the (i+1)-th sector is executed with involving the above-described substitution sector, and thereafter, the writing operation will be continuously performed for the subsequent (i+2)-th sector.

As a result, an access to the above-described substitution sector may be realized immediately after the failed sector (namely, after 1 sector time), so that the data transfer operation may be consecutively effected without such a useless rotation waiting time, while reading/writing the data from/to the regions including the failed sectors.

Subsequently, in such an arrangement that, for instance, a plurality of data reading/writing heads are independently operated, after the completion of the head positioning operations to an l-th track, all of the sectors on this track are continuously read/written via the data buffer corresponding to this track. Also, both the head positioning operations to other information tracks (for instance, (i+1)-th track) and the data read/write operations thereto are performed in asynchronism with those for the above-described i-th track. Furthermore, the substitution sector used for the failed sector on the i-th track is allocated to the i-th region in at least more than one recording plane containing the substitution information track, and the substitution sector corresponding to the (i+1)-th track is allocated to the (i+1)-th region. Then, when the data on the i-th track are read out, if the head used for the substitution information track is not under use, a plurality of blocks in the i-th region of the substitution recording plane are simultaneously read out and then read into the corresponding data buffer.

The above-described data buffer for the substitution purpose is made effective only when the substitution sectors have been allocated within the range to which the i-th track is read, whereas when no substitution sectors have been allocated thereto, the substitution region for other information track (for instance, (i+1)-th track) is read out. As to the failed sector occurring during the data writing operation to the i-th track, the substitution sectors are allocated to the i-th region within the above-explained substitution recording planes.

As a result, the substitution sectors within the i-th substitution region may be accessed without transporting the head for reading/writing the data on the i-th track, and the effective data transfer velocity involving the substitution process may be improved. Moreover, the data may be independently transferred among a plurality of information tracks containing the substitution process, and therefore the effective data transfer speed may be increased in case that the data are transferred in a parallel mode in unit of this information track among each of the plural high order apparatuses.

BRIEF DESCRIPTION OF THE DRAWINGS

FIGS. 10A and 10B are flow charts for representing operations of the rotary type information storage apparatus shown in FIGS. 7 and 8 during the reading operation; and, FIGS. 11A and 11B are flow charts for showing operations of the rotary type information storage apparatus shown in FIGS. 7 and 8.

DESCRIPTION OF THE PREFERRED EMBODIMENTS

Figure 1:
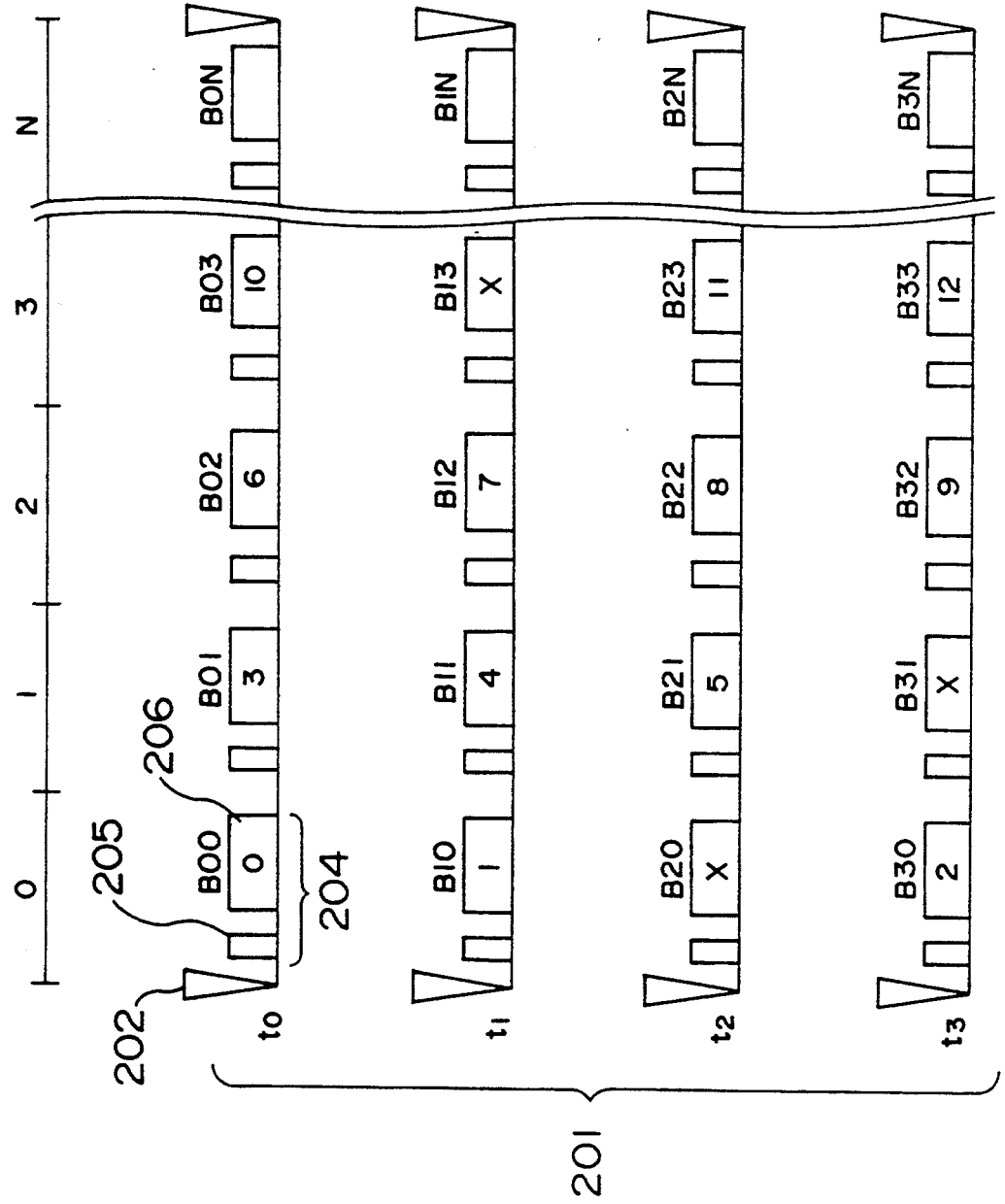
FIG. 1 is an explanatory diagram for representing one example of a track format set to a conventional rotary type information recording medium.

Referring now to the drawings, both a rotary type information storage apparatus and a control method therefor according to one preferred embodiment of the present invention will be described.

An explanation will now be made of the rotary type storage apparatus and the arrangement of the information processing system employing this storage apparatus according to this preferred embodiment with reference to FIG. 4.

In preferred this preferred embodiment, an optical disk storage apparatus will now be described as one example of the rotary type storage apparatus.

A high order apparatus 1 is constructed of, for instance, a central processing unit (CPU) and a channel for controlling data input/output operations performed between an external device and a computer system, instead of CPU, and is connected via a channel interface 2 to an interface control circuit 5 of the an optical disk storage apparatus 3 according to this preferred embodiment. The interface control circuit 5 is connected via a selector 6 to data buffers 7a, 7b and 7c which are then connected to a device interface control circuit 8. The device interface control circuit 8 is connected via read/write control circuits 10 and access mechanisms 11 within a head disk assembly unit 9 (referred to as an "HDA unit"). A spindle rotates a plurality of optical disks 14. The read/write control circuits 10 independently can execute data read/write operations for each of plural heads 12.

Figure 3:
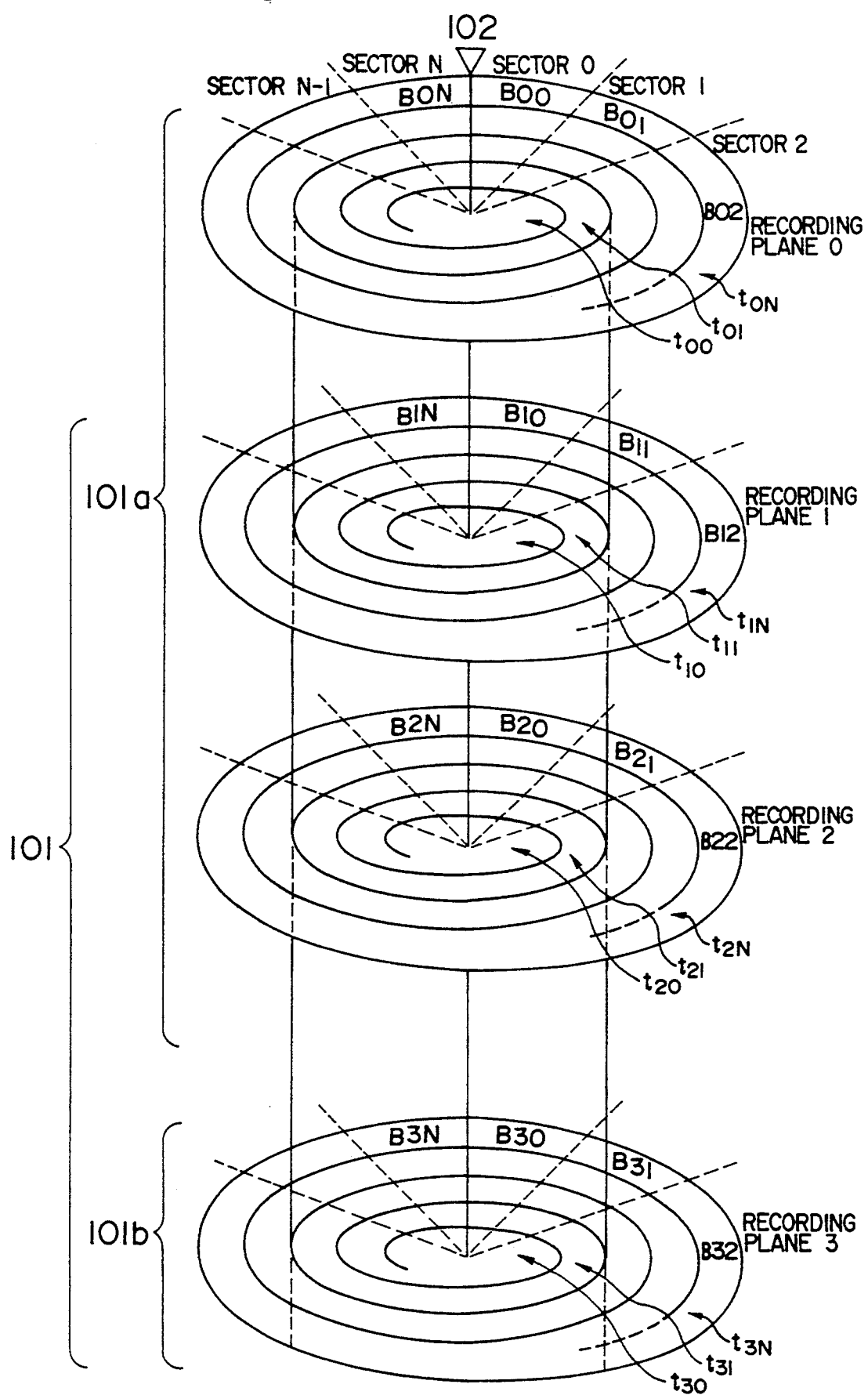
FIG. 3 schematically illustrates an arrangement of a track in the rotary type information recording medium of the rotary type storage apparatus shown in FIG. 2 according to one embodiment of the present invention.

Similarly, although not shown in this drawing, each of the access mechanisms 11 is constructed of a coarse transport mechanism and a fine transport mechanism. The coarse transport mechanism roughly positions the plural heads 12 (as shown in FIG. 3) with respect to the cylinder, and thereafter the heads are precisely positioned to each of these tracks within this cylinder by way of the fine transport mechanism.

Also, the device interface control circuit 8 transfers the data of the plural tracks from the read/write control circuit 10 to the corresponding data buffers 7a, 7b, and 7c in a parallel form.

In a practical case, it is so arranged that the data buffers are employed as for all of track numbers including substitute tracks to which a plurality of heads 12 are simultaneously accessible, and each of these data buffers has a data capacity higher than the data capacity of at least a single track.

The control unit 4 controls the entire operation of the respective portions within the above-described optical disk storage apparatus 3.

Figure 4:
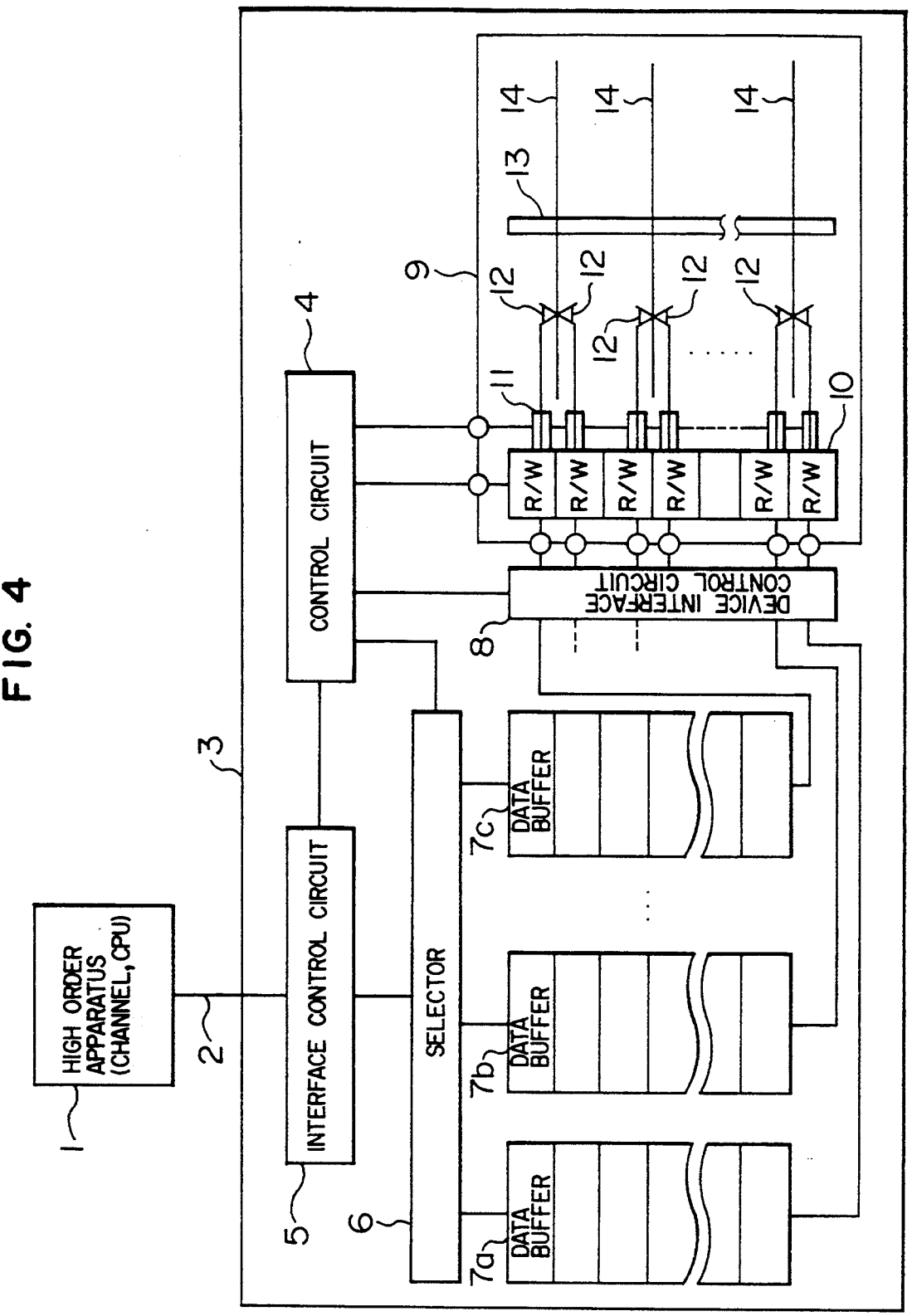
FIG. 4 is a schematic block diagram for showing the rotary type information recording medium shown in FIG. 2 and an arrangement of a system employing this recording medium, according to one embodiment of the present invention.

In FIG. 4, during the data reading operation, after the heads 12 have been positioned by the access mechanisms 11, the blocks (ID parts and data parts) on the tracks are read out by the heads 12 every track, and then are written into the corresponding data buffers 7a, 7b, 7c via the read/write control circuit 10 and device interface control circuit 8. Then, the selector 6 selects the data buffers 7a, 7b and 7c one by one in accordance with a track address sequence (for instance, 7a, 7b, ---, 7c in this order), and thus transfers the data (usually only the data part) of the block corresponding to one of these selectors via the interface control circuit and channel interface 2 to the high order apparatus 1. When the data on all of the tracks to which a plurality of heads 12 are simultaneously accessible with respect to one sector have been transferred, the selector 6 performs such a data transfer with respect to the subsequent sector while selecting the data buffers 7a, 7b and 7c.

Although the data read operations have been described in the above description, since a data transfer direction during the data write operations is opposite to that of the data read operations and operations of the respective circuit arrangements are substantially same as in the data read operations, the further detailed explanation is omitted.

it should be noted that the above-described operations are executed under control of the control unit 4 of the optical disk storage apparatus 3 according to this preferred embodiment.

On the other hand, as represented in FIG. 3, the optical disk 14 mounted on the optical disk storage apparatus 3, according to this preferred embodiment, as the rotary type storage medium, is constructed of a plurality of recording planes (recording plane "0" to recording plane "3"). A single spiral shaped information track is formed on the respective recording planes. This information track is theoretically subdivided into a plurality of tracks (tracks $t_{00}-t_{0N}$, $t_{10}-t_{1N}$, $t_{20}-t_{2N}$ and $t_{30}-t_{3N}$ with respect to the respective recording planes) under such a condition that an index signal 102 is a starting point. Furthermore, this track 101 is subdivided into a plurality of sectors 103 (sector 0, sector 1, ---, sector N-1 and sector N) along a circumferential direction thereof. The data in this sector are handled as the block which corresponds to a minimum data unit read and written between the high order apparatus 1 and this sector.

Also, as viewed from the upper direction with respect to each of the recording planes, the tracks present at the same positions thereof along the radial direction are combined and called a "cylinder", and this cylinder is constructed of plural tracks (e.g., tracks $t_{00}$, $t_{20}$, $t_{30}$).

Here, it is noted that according to this preferred embodiment, at least one track ($t_{30}$) belonging to at least one specific recording plane among a plurality of tracks for constituting the cylinder, is allocated to a substitution track used for recording user data on other plural tracks with the same cylinder.

In other words, at least one of the plural recording planes is exclusively used for arranging the substitution track.

Figure 2:
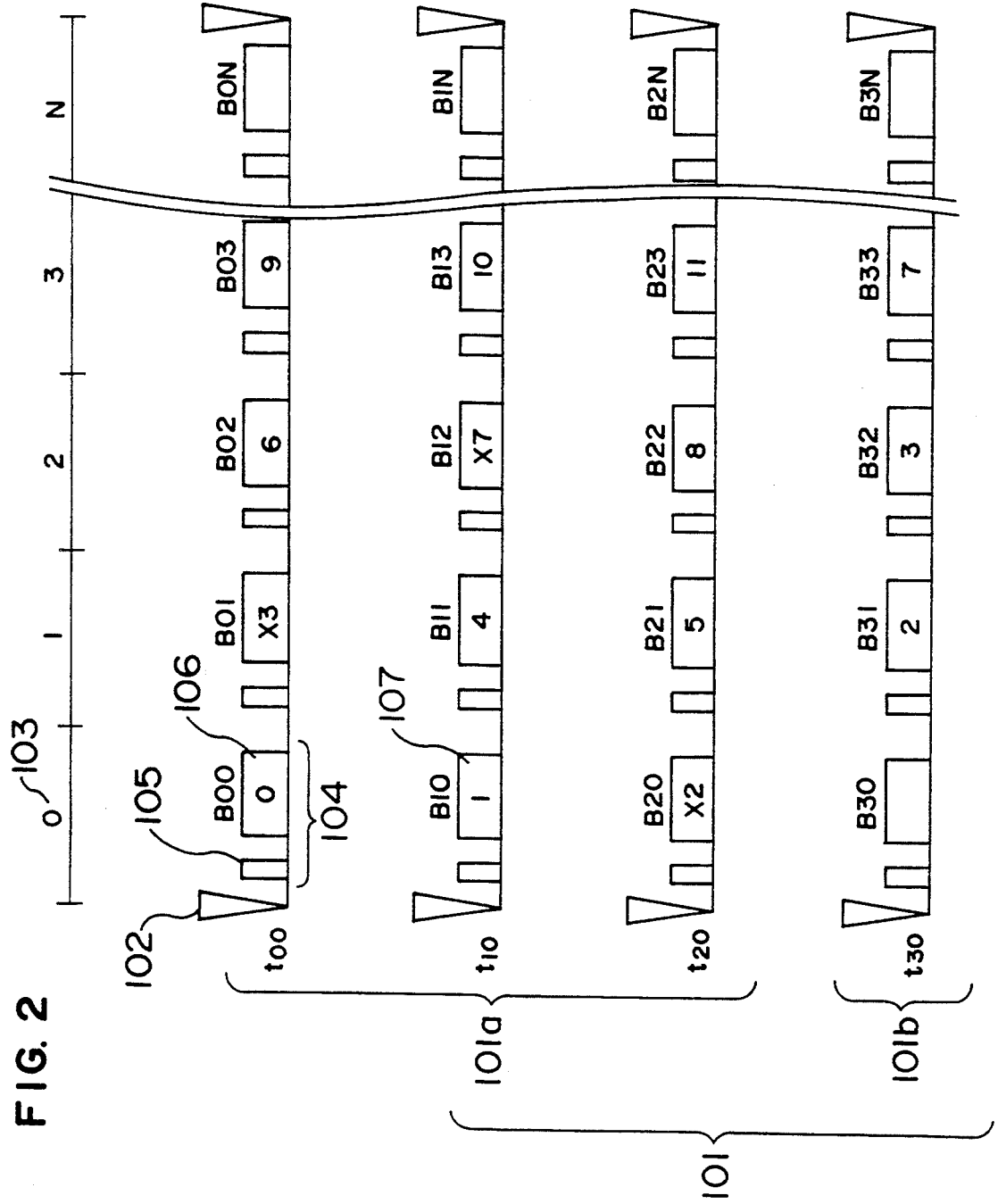
FIG. 2 is a conceptual diagram for representing one example of a track format set to a rotary type information recording medium for a rotary type information storage apparatus according to one preferred embodiment of the present invention.

Subsequently, there is schematically shown in FIG. 2, a track format of the optical disk 14 according to this preferred embodiment within the same cylinder.

As represented in FIG. 2, in case of this preferred embodiment, a recording plane is constructed of 4 recording planes, and therefore the number of tracks 101 from which data can be parallel-transferred by a plurality of heads 12 driven by a single access mechanism 11 becomes four (from track $t_{00}$ to track $t_{30}$). Among these 4 tracks, one track $t_{30}$ is used as the substitution track 101, and the remaining tracks are used as the user track 101a on which the normal data are recorded. It should be noted that although a total number of these user track 101a and substitution track 101b is 4 for the sake of explanation, this track number is not limited thereto, but may be freely set. Furthermore, although FIG. 3 represents that a plurality of independent recording planes have been arranged, the recording plane arrangement is not restricted thereto, but may be realized in a disk both of which recording planes are used for recording data thereon.

Each of the tracks 101 is handled as one track under such a condition that an index signal 102 of a single spiral-shaped information recording region of a single circle within the recording plane is a starting point. Furthermore, each of these tracks is subdivided into (N+1) sectors 103 (sector "0" to sector "N"). One block 104 is allocated to the above described single sector 103. It should be noted that since the above-described index signal 102 is employed so as to theoretically recognize the beginning of the respective tracks, it is not practically required.

In this preferred embodiment, user data are recorded on the block $B_{00}$ to the block $B_{2N}$ (except for the substitution blocks $B_{30}$, $B_{31}$, ---, $B_{3N}$) on one cylinder of the user track 101a ($t_{00}$, $t_{10}$, $t_{20}$), and the recording sequence of the user data is preset to the address sequence of the user track 101a every sector, namely the order of the blocks $B_{00}$, $B_{10}$, $B_{20}$, $B_{01}$, $B_{11}$, $B_{21}$,---, $B_{2N}$. In accordance with such a sequence, the logic block number 107 (0, 1, 2,---, 10, 11,---) is allocated and the high order apparatus 1 will access to the optical disk 14 with employment of this logic block number 107.

Each of the above-described blocks 104 is arranged by an ID part 105 and a data part 106 containing user data and control information such as an error correction code (ECC). The ID part 105 has address information (track address and sector address and so on) of this block 104, and this is preformatted during a manufacture of a recording medium. It should be noted this may be initialized so as to record the above-described address information thereon after being assembled in the optical disk storage apparatus. Also, a sector good/no good flag for indicating whether or not the relevant sector is a failed sector may be recorded on this ID part 105 other than the above-described address information.

In this preferred embodiment, it is assumed that three blocks ($B_{20}$, $B_{01}$, $B_{12}$) among 12 blocks 104 on the four sectors 103 (0 to 3) correspond to failed blocks. It should be noted that in the block on the respective failed sector, the substitution sector has been allocated to the next sector on the substitution track 101. That is, the block $B_{20}$ has been allocated to the block $B_{31}$; the block $B_{01}$ has been allocated to the block $B_{32}$; and the block $B_{12}$ has been allocated to the block $B_{33}$ as the substitution destination. The allocation of the substitution sectors for the failed sector may be performed when the overall recording medium is initialized before actual use of this recording medium, or when the failed sector is newly detected during the data writing operation after the recording medium has been firstly used.

Then, operations of such a case that the 12 blocks of the logic at block numbers 107 (0 to 11) according to this preferred embodiment are read out and transferred to the high order apparatus 1, will now be explained with reference to the flow chart shown in FIG. 5.

Figure 5:
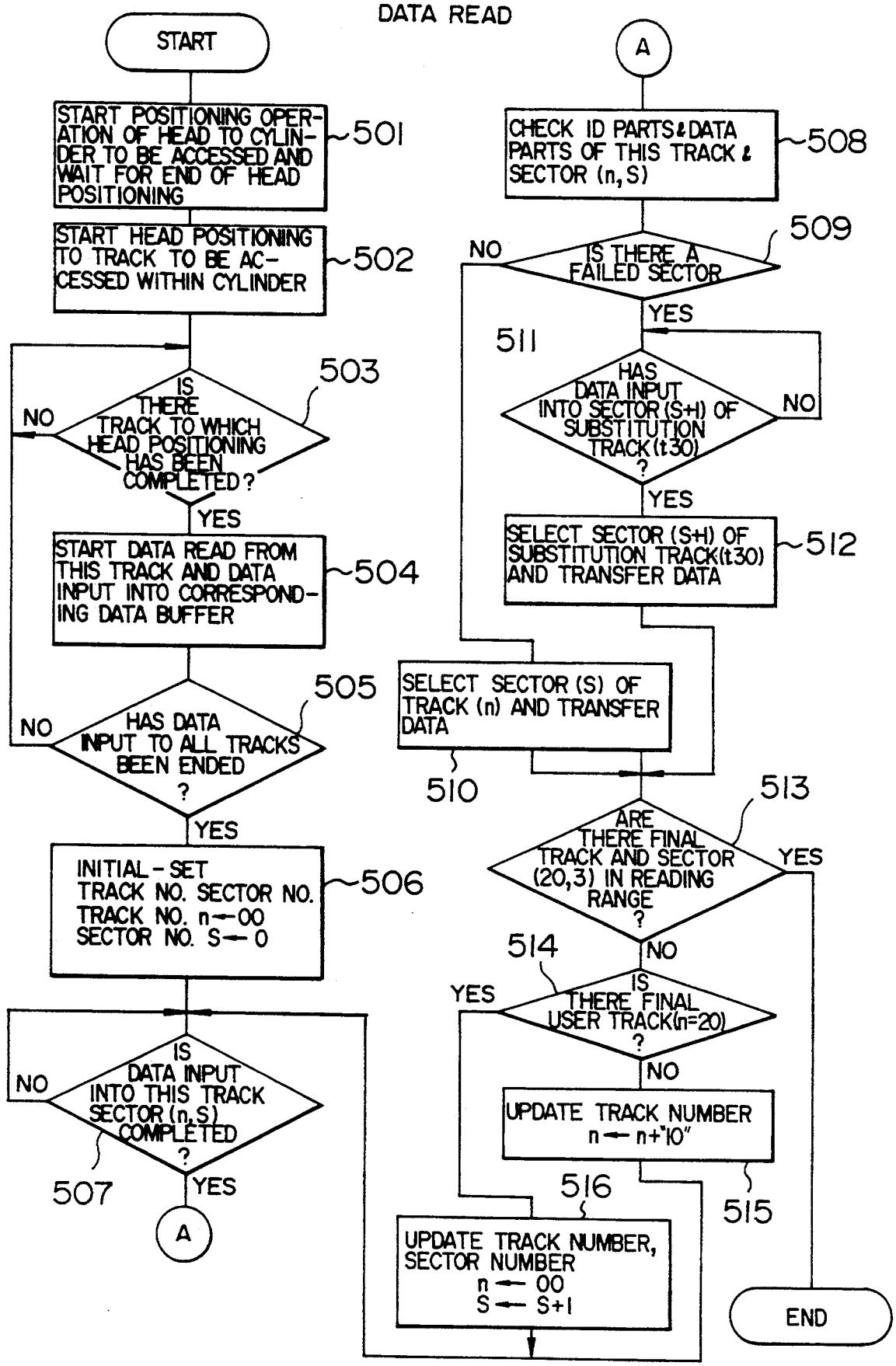
FIG. 5 is a flow chart for representing operations of the rotary type information control apparatus shown in FIG. 2 during the read operation, according to one embodiment of the present invention.

In FIG. 5, the positioning operation of the head 12 to the cylinder to be accessed is performed (a step 501). As previously stated, each of the heads are roughly positioned to the cylinder to be accessed, containing the user track 101a, among a plurality of cylinders constructed of plural user tracks 101a and substitution track 101b by utilizing the coarse transport mechanism (not shown in detail) of the access mechanism 11. After the positioning operation of the heads to the cylinder to be accessed has been completed, the fine positioning operations of the head to the user tracks 101a and substitution tracks 101b within the cylinder are performed by using the fine transport mechanism (not shown in detail) of the access mechanism 11 (a step 502). Thereafter, a check is made to determine whether or not the user track 101a to which the above-described fine positioning of the head has been accomplished is present at a step 503. The data read out from the user track 101a to which the head positioning operation has been completed and the read data is commenced to be inputted into the data buffers 7a to 7c corresponding to this user track (a step 504).

In this preferred embodiment, the read/write control circuit 10 is so operated that the data of the plural sectors of the same cylinder at the same position of the respective user tracks 101a in the circumferential direction are simultaneously inputted into the data buffers 7a to 7c.

Subsequently, a check is made to determine whether or not both the data readout operations for all of the user tracks 101a and the data input operation to the data buffers are commenced (a step 505). If there exists the user track 101a where the above-described input operation is not yet commenced, the process is returned to a step 503. In case when the data readout and input operations have been commenced with respect to all of the tracks, both the track numbers and the sector numbers for the above-described selector and check circuitry provided in control unit 4 are initialized (a step 506). In this preferred embodiment, since the data read head block corresponds to the track "$t_{00}$" and the sector "0", it is determined that the track number n=00 and the sector number s=0. Subsequently, the blocks of three tracks (t00, t10, t20) with respect to the sector number "s" are successively transferred.

First, a check is made of the data buffer positions corresponding to the track number and sector number (n, s) so as to judge whether or not the content (ID part and data part) of the relevant block has been inputted. The process is brought into the waiting state until the content of the relevant block is inputted (a step 507). After the content of the relevant block has been inputted, the ID part 105 of this block is read out from the data buffer and verification is made whether or not the recorded content of the correct block has been inputted. Furthermore, the data part 106 is verified (a step 508) and a check is made whether or not it is a failed block as a result of this verification (a step 509). If it is a correct sector, the selector 6 selects the data buffer corresponding to the relevant track number and sector number (n, s) the data (data part 106) of the relevant block are transferred to the interface control circuit 5, and then the data are further transferred via the channel interface 2 to the high order apparatus 1 (a step 510).

If it is a failed sector at the previous step 509, the process waits for the input operation of the block for a sector (s+1) subsequent to the substitution track (t30)to be completed (step 511). If the input operation of this block is accomplished, the selector 6 transfers the data (data part 106) of the relevant block in the similar method of the above described step 510 (a step 512). It should be noted that the substitution sector to which the above described data are transferred is not a failed sector.

Next, a judgement is performed to determine whether or not the data transfer operations have been completed for the final track number and sector number within the readout range (a step 513). If the data transfer operations of all of the blocks have been accomplished, the process is ended.

If the transfer operations of all of the blocks have not yet been completed at the above step 513, a check is carried out to determine whether or not the transfer operation of the final user track number (n=20) of the relevant sector has been completed (a step 514). If not yet accomplished, the track number is incremented by "10" (step 515) and the process is returned to the previous step 507 so as to transfer the block on the subsequent track at the position of the relevant sector.

When the block transfer operation for the final track number (n=20) of the relevant sector is accomplished at the step 514, this sector number "s" is incremented by 1 and the track number "n" is set to 00 (a step 516). To perform the data transfer operation of the head track "t00∞ at the next sector position, the process is returned to the step 507.

As previously explained, according to this preferred embodiment, the plural blocks on the respective tracks are consecutively read into the corresponding data buffer, and such read operations are carried out in a parallel form with respect to the plural tracks. The data transfer operation to the high order apparatus 1 is performed while selecting the data buffer every 1 block. As a consequence, with respect to the failed sector, the data on the substitution sector may be transferred with only a delay of one sector time and subsequently the data transfer operations for the succeeding sectors may be carried out, so that even if there is a failed sector, there is no waste of time waiting for the rotation of the recording medium.

Figure 6:
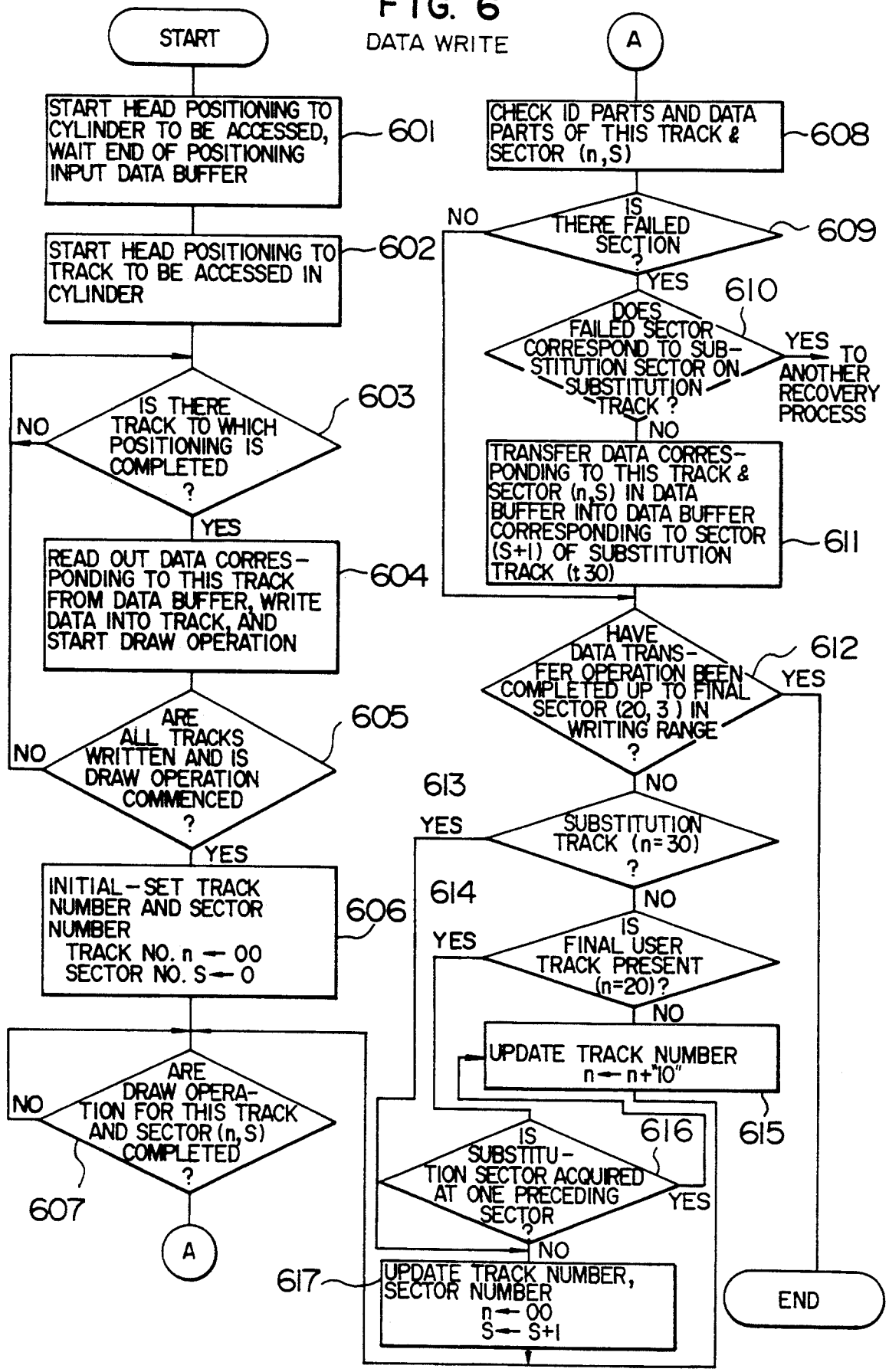
FIG. 6 is a flow chart for illustrating operations of the rotary type information control apparatus shown in FIG. 2 during the writing operation, according to one embodiment of the present invention.

Next, the data writing operation according to this preferred embodiment will now be described with reference to a flow chart shown in FIG. 6.

First, the head 12 is positioned to the cylinder to be accessed by utilizing the fine transport mechanism, and the data from the high order apparatus 1 are inputted via the channel interface control circuit 5 and selector 6 to the data buffers 7a, 7b and 7c (a step 601). Then, the head positioning operation to the accessible user track 101a within the cylinder which has been set by the high order apparatus 1 is commenced (a step 502). When there exists such a user track 101a to which the head has been positioned, the data are read out from the data buffers 7a, 7b and 7c corresponding to this user track 101a and also the data are written into the user track 101a. At the same time a DRAW (Direct Read After Write) operation starts at a step 604.

When the above described data writing operation and DRAW operation have been commenced with respect to all of the user tracks 101a (a step 605), a check circuit in control unit is initialized and track number n=00, sector number s=0 are set, for judging if the data writing operation is completed and whether the sector is a failed sector or not (step 606). Subsequently, blocks corresponding to three tracks of the user track 101a are sequentially transferred.

Thus, when the DRAW operations of the tracks and sectors (n, s) sequentially designated have been completed (a step 607), a check is made of the ID part 105 as well as the data part 106 for both of this track and sector (a step 608). If a judgement is made that this sector is not a failed sector at a step 609, and such a check has been completed for the final track t20 and the final sector 3 (20, 3) within the write range (a step 612), then the write operation is accomplished.

If a judgement at the step 609 is made that at least one of the DRAW-operated ID part 105 and data part 106 corresponds to a failed or extraordinary sector, another judgement is made whether this failed sector is present on the user track 101a or substitution track 101b (a step 610). If a judgement is made that such a failed sector is present on the user track 101a, the data in the data buffers with respect to the track and sector which have been judged as the failures, are transported to the data buffer corresponding to the sector "s+1" of the substitution track t30 (a step 611). If a "YES" judgement is made in step 610, data writing and DRAW operations are re-started by re-positioning a head to a common substitution region (a common substitution tracks assigned for all cylinders) or a recording plane for a substitution sector.

In any other case, writing is carried on until the failed sector is re-written in the substitution sector by shifting the writing sector position on the substitution track (by one track in this embodiment).

Thereafter, a check is made to determine whether or not the data writing operations have been completed through the final track number and sector number within the writing range (a step 612). In such a case that all of the block transfer operations have not yet been accomplished due to occurrences of failed sectors, a check is made to determine whether or not the sector number corresponds to the substitution track number (n=30) (step 613), and if the sector number does not correspond to a substitution track, a check is made to determine whether or not the data transfer operations have been completed for the final track number (n=20) of the relevant sector (step 614). If the data transfer operations have not yet been completed for this final track number (n=20) at the relevant sector position, the track number "n" is incremented by "10" (a step 615), and the process is returned to the previous step 607 at which the block of the subsequent track on this sector position is transferred.

When the data transfer operations have been completed for the final track number (n=20) of the relevant sector at the step 614, a judgement is made whether or not the substitution sector has been acquired at one preceding sector (a step 616). The track number "n" is incremented by 1 at a step 615 and the process is returned to the step 607.

Furthermore, in case that the substitution sector has not yet been obtained at one preceding sector at the step 616, or the sector number corresponds to the substitution track number (n=30) in step 613, the relevant sector number "S" is increased by 1 and the track number "n" is set to "00" at a step 617. The process is returned to the previous step 607 at which the data transfer operation of the head track "$t_{00}$" at the next sector position and judgement if the sector is a failed sector are performed.

As previously explained, during the data writing operation, when the failed sector is detected by the DRAW operation under the data transfer direction opposite to that of the data readout operation, the data are transferred from the corresponding data buffer to the subsequent sector position of the data buffer corresponding to the substitution track 101b ($t_{30}$), and then the above-described substitution sector is written at the writing timing of the next sector, whereby there is no waste of time waiting for the rotation of the recording medium that is similar to the advantage achieved during the data reading operation.

Referring now to FIGS. 7 to 11A and 11B, a rotary type storage apparatus and a control method therefor according to another preferred embodiment of the present invention will be described in detail.

In the optical disk storage apparatus 23 of this preferred embodiment, both an access mechanism 31 constructed of a coarse transport mechanism 31a and a fine transport mechanism 31b, and a read/write control circuit 30 are separately provided with a plurality of heads 32. A difference between the previous embodiment shown in FIGS. 2 to 6, and this embodiment is as follows. Each of the plural heads 32 may be independently positioned to each track 601 on the respective recording plane (by way of the coarse transport and fine transport), and data may be separately read/written therefrom/thereto.

Also, a plurality of data buffers 27a to 27c employed with respect to the respective plural heads 32 are connected via a plurality of selectors 26 and a plurality of interface control circuits 25a and 25b to a plurality of high order apparatuses 21a and 21b. Each of these circuits is totally controlled by a control unit 24.

As a consequence, the data may be simultaneously transferred in a parallel form among a plurality of high order apparatuses 21a, and also between the upper grade apparatus 21b and the optical disk 34 in a unit of track, according to this preferred embodiment.

Figure 9:
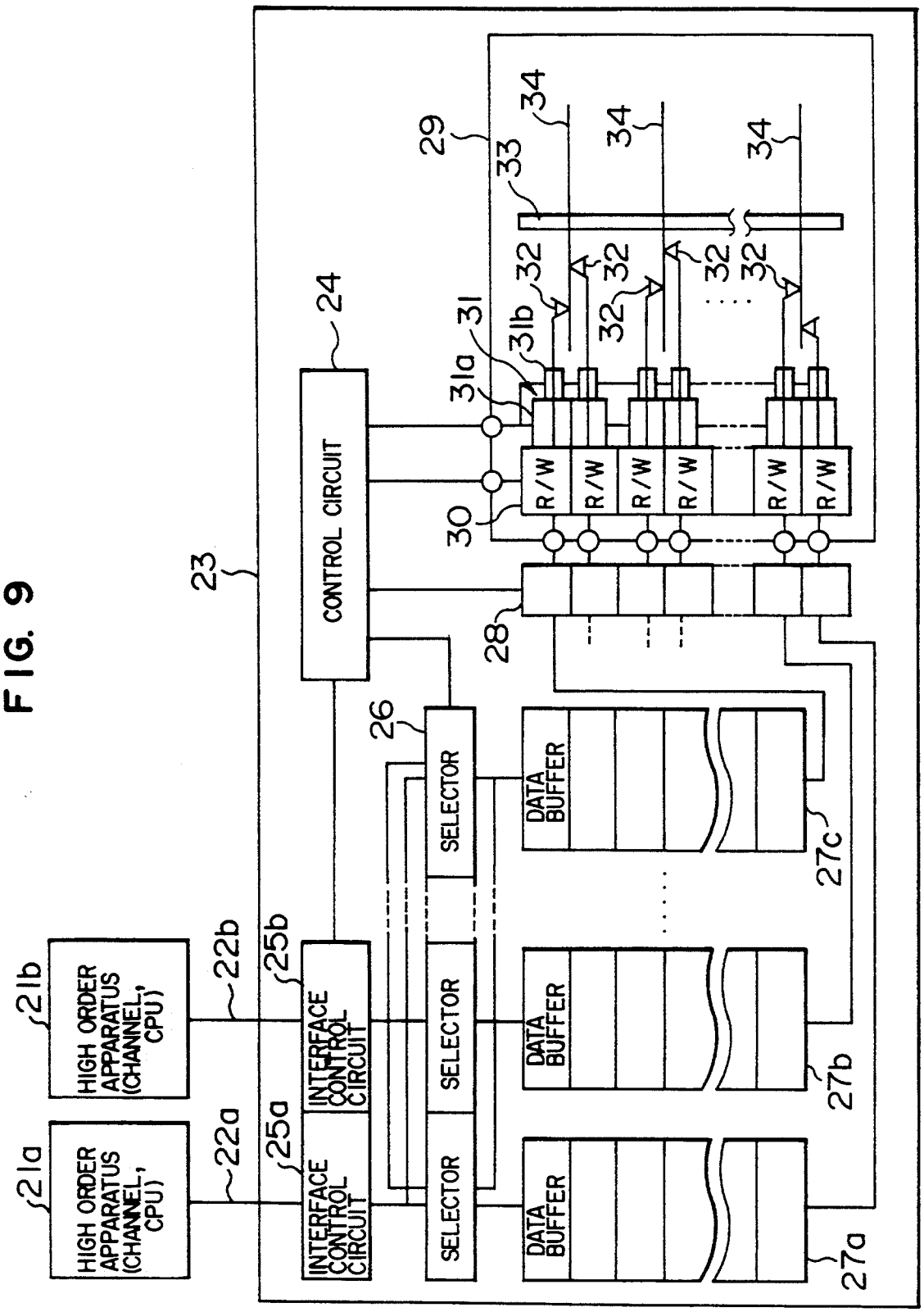
FIG. 9 represents an arrangement of a system employing the rotary type information recording medium shown in FIGS. 7 and 8.

In FIG. 9, the access mechanisms (coarse transport mechanism 31a and fine transport mechanism 31b) for the heads 32 are independently operated for each of the heads 32. Due to this reason, the accessing operations in the unit of cylinder performed in the previous embodiment are not executed in this preferred embodiment, but arbitrary tracks and sectors are separately accessed on the respective recording planes in a parallel mode.

Selectors 26 select an arbitrary data buffer from a plurality of data buffers 27a, 27b and 27c and connect the selected data buffer to interface control circuits 25a and 25b, so that data may be transferred from any of these interface control circuits 25a and 25b to an arbitrary data buffer. A plurality of high order-apparatuses 21a and 21b are connected via each of channel interfaces 22a and 22b to the above-described interface control circuits 25a and 25b. As a result, any one of the high order apparatuses 21a and 21b may access any of the tracks 601.

For instance, the data transfer operations may be simultaneously performed with respect to the plural tracks in such a manner that one high order apparatus 21a is connected via the channel interface 22a, interface control circuit 25a and selector 26 to the data buffer 27b, whereas the other high order apparatus 21b is connected via the channel interface 22b, interface control circuit 25b and selector 26 to the data buffer 27b.

As previously described, the data may be parallel-transported between the plural high order apparatuses 21a and 21b, and the optical disk 34 of the optical disk storage apparatus 23 according to this preferred embodiment.

Figure 7:
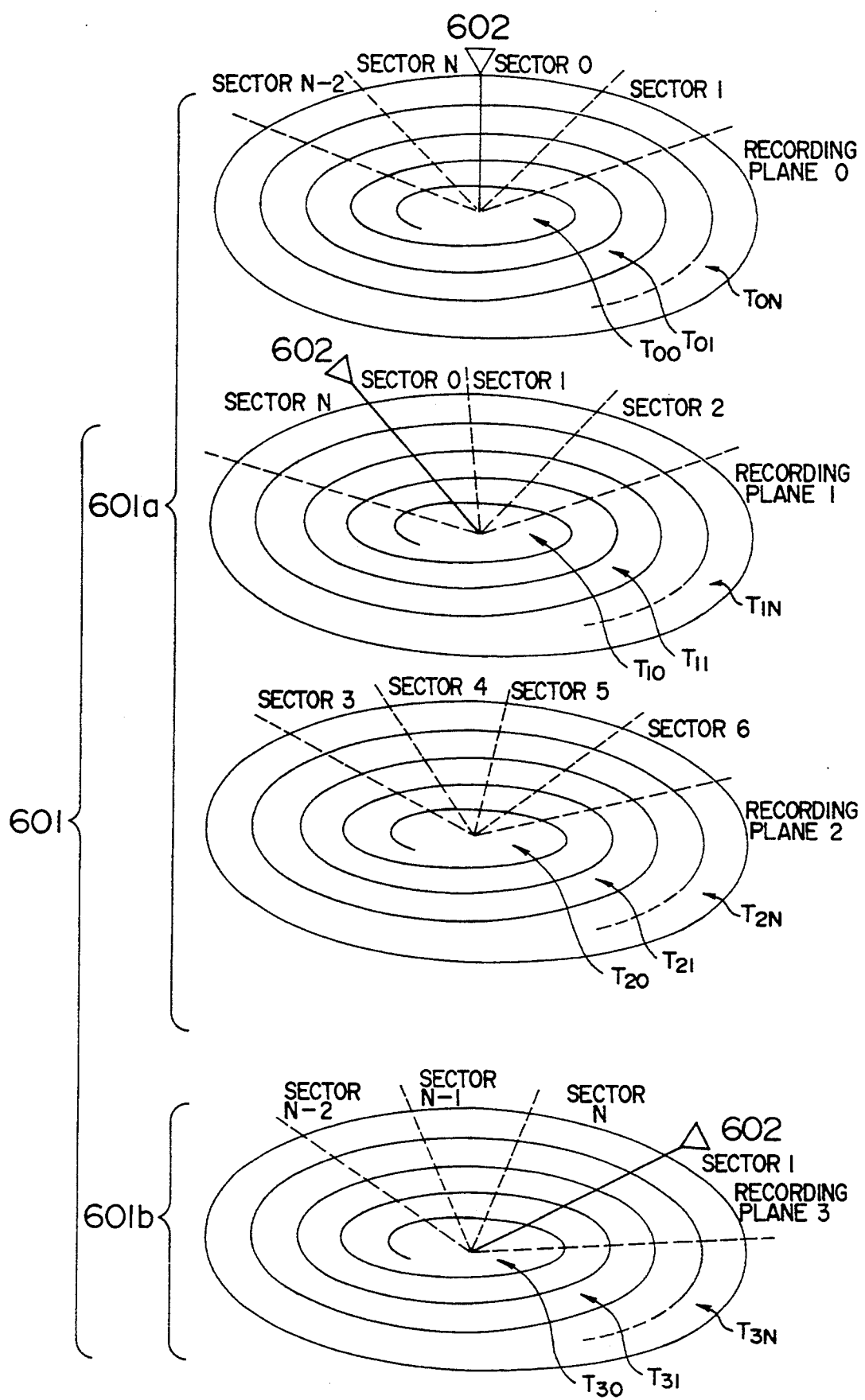
FIGS. 7 and 8 are conceptual diagrams for representing one example of a track format set in a rotary type information recording medium for a rotary type information storage apparatus, according to another preferred embodiment of the present invention.
Figure 8:
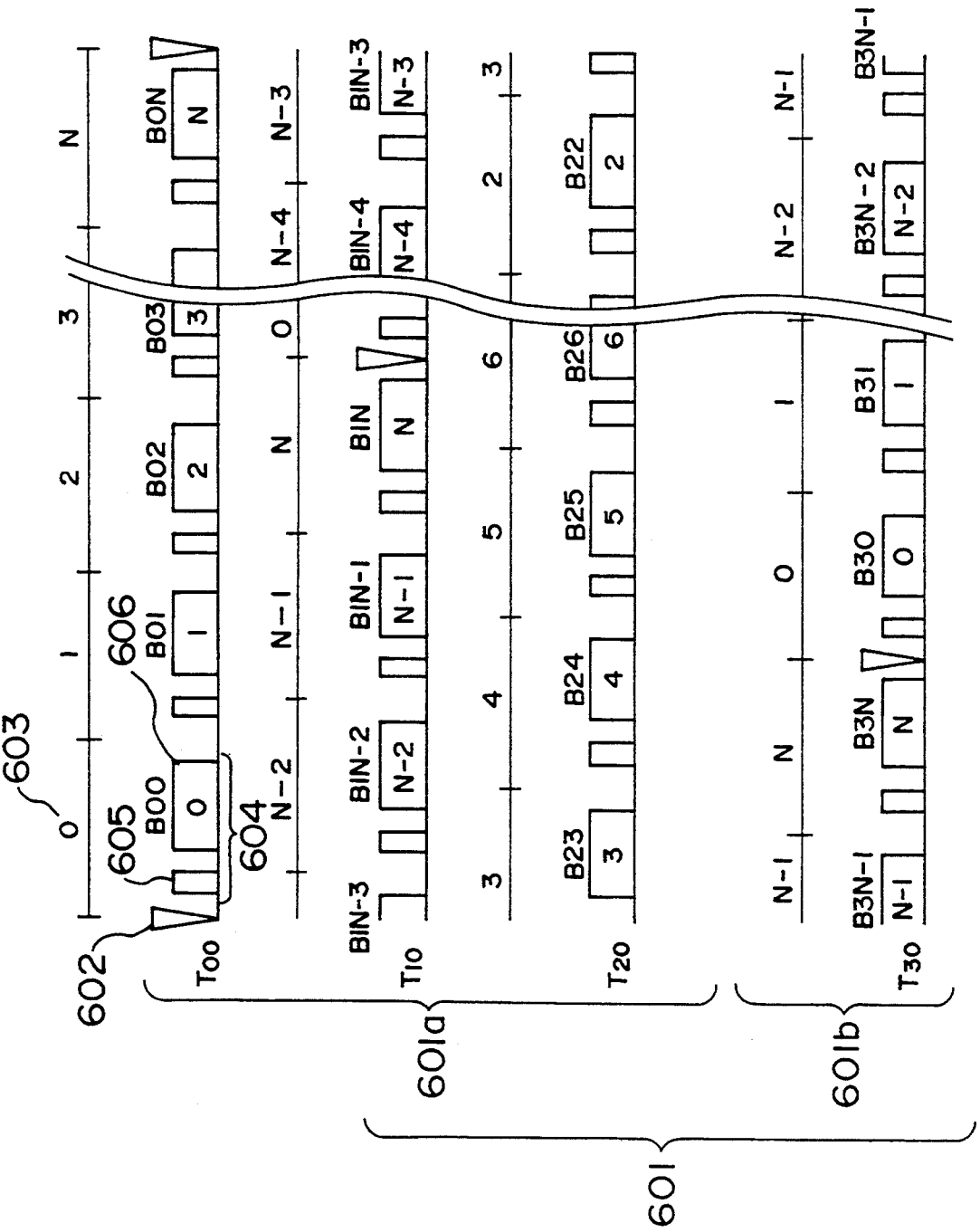

It should be noted that the optical disk 34 according to this preferred embodiment owns the track format as represented in FIGS. 7 and 8.

In FIGS. 7 and 8, a user track 601a ($T_{00}-T_{0N}$; $T_{10}-T_{1N}$, $T_{20}-T_{2N}$) among a plurality of tracks 601 is utilized as a recording region of user data, and also a substitution track 601b ($T_{30}-T_{3N}$) is used as a substitution region for the above-described user data. A plurality of tracks ($T_{00}$ to $T_{3N}$) of user track 601a and substitution track 601b are accessed by the respective heads 32 shown in FIG. 9. On the respective recording planes "0" to "3", a plurality of tracks $T_{00}$ to $T_{0N}$; $T_{10}$ to $T_{1N}$; $T_{20}$ to $T_{2N}$; and $T_{30}-T_{3N}$ have been arranged along the radial direction.

The user track 601a and substitution track 601b are subdivided into (N+1) pieces of sectors 603 (0, 1, 2,—, N) with an index signal 602 as a starting point, and the sectors 603 correspond to a block constructed of an ID part 605 and a data part 606.

In this preferred embodiment, the relative positions of the sectors 603 (0, 1, 2,—, N) of the repsective tracks ($T_{00}$ to $T_{0N}$; $T_{10}$ to $T_{1N}$; $T_{20}$ to $T_{2N}$; $T_{30}$ to $T_{3N}$) need not be set to be identical to each other, and as represented in FIGS. 7 and 8, the sectors may be subdivided into a plurality of sectors in which the index signals 602 at arbitrary positions of the respective recording planes are used as starting points. It should be noted that the index signal 602 may be physically provided, or may not be physically employed, which is similar to the above-described preferred embodiment.

Since the data transfer operations are executed with the high order apparatuses 21a and 21b in unit of the respective user tracks 601a and substitution tracks 601b, the data blocks on an arbitrary track may be allocated in the order of the sector 603, namely 0, 1, 2, —,N.

In FIG. 7, a substitution sector for an arbitrary failed sector on an arbitrary track, for instance, the track "$T_{00}$" to "$T_{0N}$" on the recording plane "0" within a predetermined recording plane on which the user track 601a is arranged, is allocated to a predetermined substitution region for the above-described recording plane within the substitution track 601b. The substitution track 601b is arranged by at least more than one track, which is similar to the above-mentioned user track 601a, and the tracks "$T_{30}$" to "$T_{3N}$" belonging to this substitution track 601b in the radial direction are subdivided into each of the user tracks 601a so as to be allocated as the substitution regions.

As previously stated in the preamble of this specification, with respect to (N+1) pieces of sectors 603 on the above user tracks 601a, for instance, several sectors at the track terminals on the respective recording planes 0, 1 and 2 along the radial direction may be allocated as the substitution sectors, and it may be constructed that the tracks "$T_{30}$ to "$T_{3N}$" of the recording plane 3 along the radial direction when these substitution sectors have been used up are utilized as an overall common substitution sector region, whereby the substitution region of the above described substitution track 601b is used.

Then, operations when the blocks on the plural consecutive tracks ($t_a - t_b$) made from the sector number "c" of the track number "$t_a$" to the sector number "d" of the track number "$t_b$" within the recording plane in the radial direction, on which the track "$T_{00}$" of the user tracks 601a is arranged, are read and then transferred to either the high order apparatus 21a, or 21b, will now be described with reference to a flow chart of FIG. 10. It should be noted that a plurality of tracks ($t_m$, $t_{m+1}$, $t_{m+2}$,—) belonging to the recording plane 3 on which the track "$T_{30}$" has been arranged, have been allocated as the substitution track 601b.

In FIG. 10, a selection is made of the head 32 corresponding to the track "$T_{00}$ to be accessed, and this head 32 starts to be positioned toward a head track ($t_a$) to be accessed in the radial direction within this track (a step 801).

Next, a check is established to determine whether or not the head for the substitution tracks $T_{30}$ to $T_{3N}$ has not yet been used in order to previously read the substitution sector within the substitution region allocated to the readout range (a step 802). If YES, then the head 32 for this substitution track 601b is selected and starts to be positioned to the track to be accessed within the substitution region allocated to the readout range (a step 803). If the head 32 of the substitution tracks $T_{30}$ to $T_{3N}$ is under use at the above step 802, the process jumps over the process defined at the above step 803 and advances to a further step.

In accordance with the present preferred embodiment, since the data are transferred between the recording mediums and the high order apparatuses 21a and 21b in a parallel mode and also the substitution tracks $T_{30}$ to $T_{3N}$ are used as the common substitution region for the plural tracks $T_{00}$ to $T_{2N}$, such a condition that the head 32 of the substitution track 601b is under use as defined at the above-described step 802 can happen to occur.

Next, the process waits for the head positioning to the head track ($t_a$) within the track ($T_{00}$) (a step 804). Once the head positioning has been completed, both the track number and the sector number are initialized in the control unit 24 so as to check the conditions of the respective blocks in the data buffer at the later stage (a step 805). In this preferred embodiment, since the reading head block is the track "$t_a$" and the sector "c", the track number 1=a and the sector number s=c.

Then, the data readout operation is commenced from the head sector of the relevant track "$t_l$" (note that in case of the head track $t_a$ in the data reading area, the sector number is selected to be "c"), and the read data is inputted into the data buffer corresponding to this track ($T_{00}$) (a step 806). Subsequently, a check is made to determine whether the sectors into which the data have been inputted are good or not good, and the data transfer operation to the high order apparatus 21a or 21b is performed in track units ($t_l$).

The data buffer corresponding to the track number and sector number (1, s) is checked and the process waits until the block to be accessed is inputted (step 807). After the block to be accessed has been inputted, verification is executed whether or not the ID part 605 of this block is read out from the data buffer and the correct block has been inputted. Furthermore, the data part 606 of this block is verified (a step 808) and a check is made whether this sector is good or not good as a result of the verification (a step 809). In case of the correct block, a check is made whether or not this sector corresponds to the final sector on this track ($t_l$) (a step 810). If this sector does not correspond to the final sector, this sector number "s" is updated to be increased by 1 (a step 811) and then the process is returned to the step 807 at which the process waits an input of the next sector of this track "$t_l$".

If the checking operations for the last sector on the relevant track have been completed at the step 810, as shown in FIG. 9, the data (normally, only the data part 606) of all the sectors on this track are transferred via the interface control circuit (for instance, 25a) and the channel interface (for instance, 22a) to the high order apparatus (for instance, 21a) by selecting the data buffer to be accessed (for instance, 27a) by the selector 26 at a step 812.

Thereafter, another check is made to determine whether or not the data transfer operations until for the final track and sector ("b" and "d") within the readout range at a step 813. If YES, then the process is ended. If the data to be transferred remains, the track number "1" is incremented by and the sector number "s" is set to "0" (head sector) at a step 814, and the process is returned to a step. 805 at which the data on the subsequent track ($t_{l+1}$) will be transferred.

If a judgement result is made that the sector corresponds to the failed sector at the above described step 809, the data are read out from the substitution sector and the data on the failed sector stored in the above-described data buffer are replaced, or substituted thereby at the subsequent steps. That is to say, a judgement is made whether or not the data have been inputted into the relevant substitution region for the data buffer of the substitution track ($T_{30}$- $T_{3H}$) at a step 815. If NO, then another check is made to determine whether or not the heads have been positioned to the track ($t_m$) of the substitution region (a step 816). If the head positioning operation is not yet commenced, a check is made to determine whether or not the head 32 for the substitution track $T_{30}$ to $T_{3N}$ has not yet been used so as to select the substitution head $T_{30}$ to $T_{3N}$. If this head 32 is under use, then the process waits until use of this head 32 is completed at a step 817.

Then, if this head 32 is not used, a selection is made of the head 32 for the substitution track $T_{30}$ to $T_{3N}$, and the head positioning operation to the track ($t_m$) to be accessed within the substitution region which has been allocated to the readout range is commenced at a step 818.

It should be noted that when the processes defined at the above described steps 815 and 816 are first executed at a step 803, since the head positioning operation to the substitution region and the data readout operation have not yet commenced, the judgement results continuously become "NO". However, as previously described, since the present embodiment is so constructed that the respective heads 32 may be separately positioned, it is possible to achieve the prereading process by the head positioning operation to the substitution track 601b. In case that the head positioning operation to the track ($t_m$) of the substitution region has been already commenced at the above-described step 803, the judging condition defined at the step 816 is satisfied and the process is advanced to a step 819.

Next, the process waits for the completion of the head positioning operation to the track ($t_m$) of the substitution region at a step 819. If the head positioning operation is completed, the data are read out from the substitution track ($t_m$) and the data are inputted to the substitution data buffer at a step 820.

Subsequently, a check is made of the above-described data buffer for a substitution purpose, and the process waits until either the substitution sector corresponding to the failed sector has been inputted, or all sectors of the relevant substitution track ($t_m$) have been inputted at a step 821. Next, another check is made whether or not the substitution sector for the failed sector has been inputted (a step 822). If the substitution sector has been inputted, the data (ID part 605 and data part 606) of the relevant substitution sector are moved to the position of the failed sector for the corresponding data buffer (a step 824) and the process is returned to the above-described step 810.

When no substitution sector is present on the corresponding substitution track ($t_m$) at the previous step 822, the substitution track number "m" is increased by 1 and the positioning operation to this track ($t_{m+1}$) is commenced at a step 823 in order to read the data on the next track within the substitution region, and then the process is returned to the above-described step 819.

It should be noted that the process operations as defined from the step 815 to the step 824 are repeated every one failed sector. As a result, when the process operations after the second process operation at the step 815 are executed, the judgement conditions are continuously satisfied and the process is advanced to the next step 821.

Although in FIG. 10, there are described that the head positioning operations to the track ($t_m$) of the substitution region occur at the steps 818 and 820, the data readout operations, and the data input operation to the substitution data buffer are performed after the failed sector is detected (a step 809), since the head positioning operations to the plural tracks "$T_{00}$" to "$T_{3N}$" and the data readout operations thereto may be parallel-executed in accordance with this preferred embodiment, this is practically performed in asynchronism with the head positioning operation to the user tracks (601a) and the data readout operation thereto.

As previously explained, in accordance with this preferred embodiment, a plurality of blocks on an arbitrary track within the user track 601a are continuously read into the corresponding data buffer, and also the read operations are performed at the plural tracks in the parallel form. Also, since the data transfer operation to the high order apparatus is executed in units of the above described data buffer, the data can be simultaneously transferred between the plural high order apparatuses and the plural data buffers. Furthermore, both the head positioning operation to an arbitrary track and the data readout operation therefrom, and both the head positioning operation to the substitution sector within the common substitution region which is exclusively set to a specific recording plane, and also the data readout operation therefrom may be parallel-performed. As a consequence, the head 32 of the user tracks 601a where there is a failed sector need not access the substitution region which requires a relatively long access time, and the data can be continuously transferred, so that there is neither a useless positioning operation, nor a wasted waiting operation for the rotary type recording medium even when such a failed sector exists.

Figure 11A:
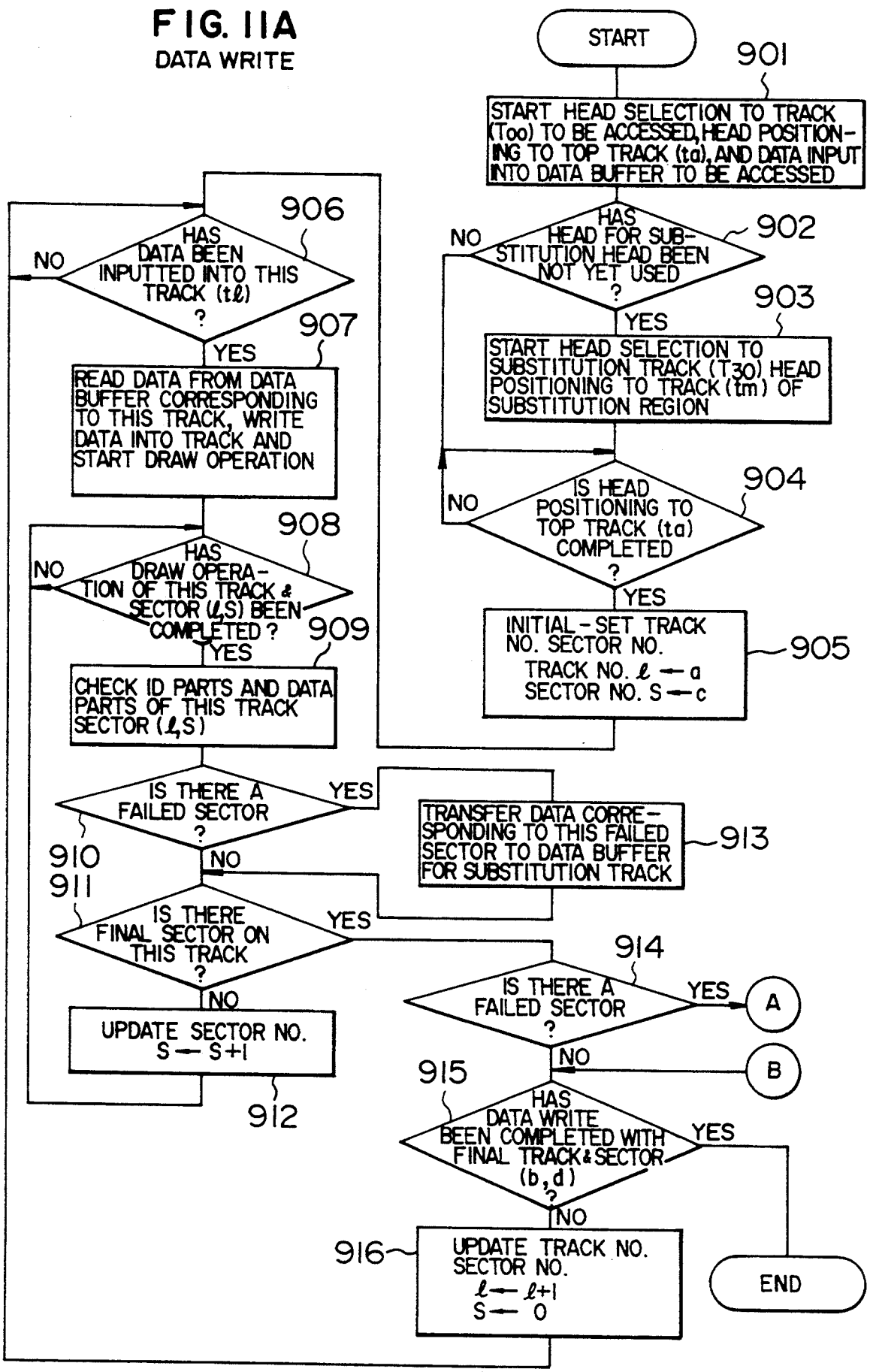
Figure 11B:
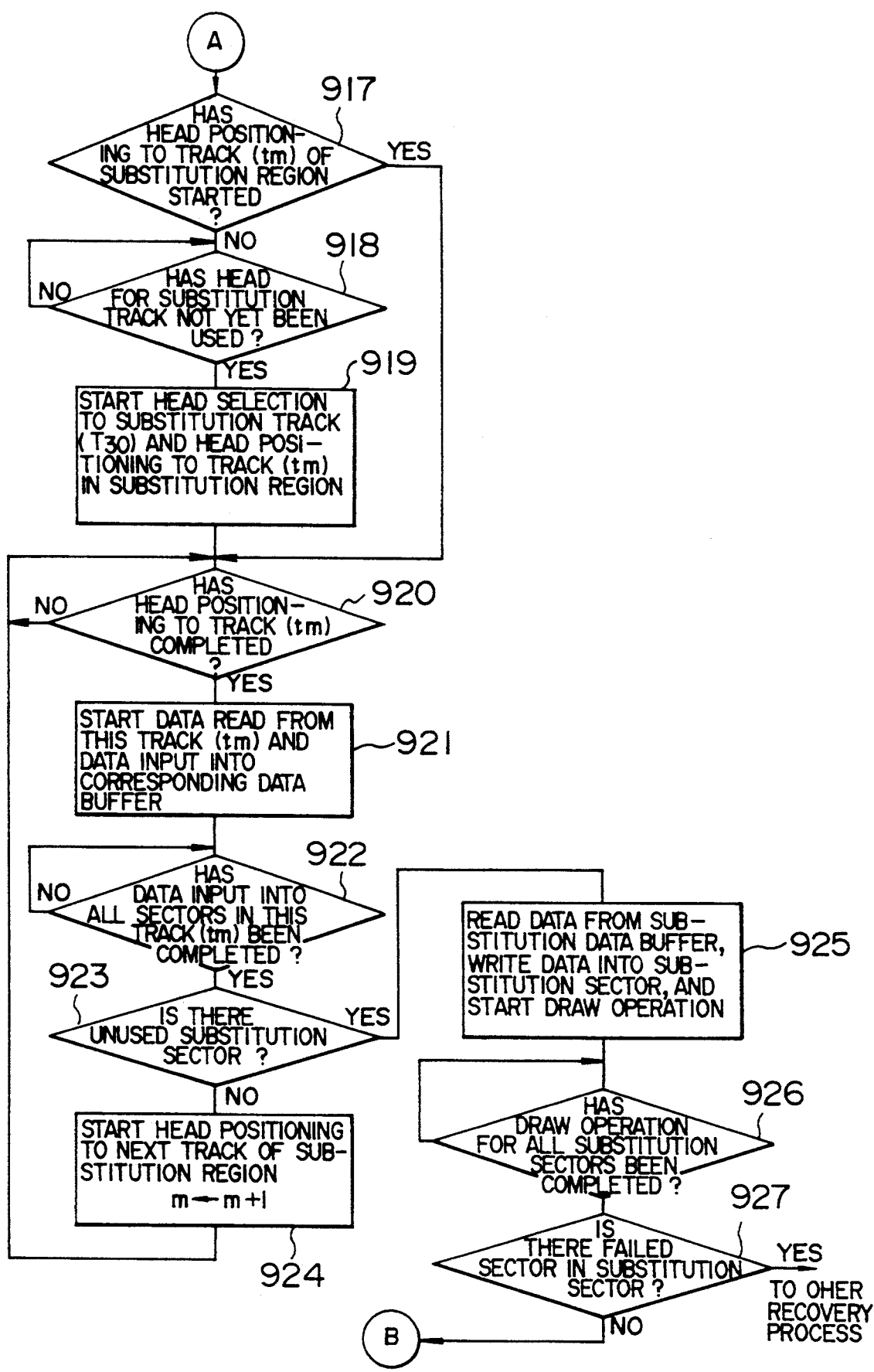

A data writing operation according to this preferred embodiment will now be described based upon flow charts shown in FIGS. 11A and 11B.

First, a selection is made of the head 32 corresponding to the tracks "$T_{00}$" to be written by the data, the head positioning operation to the head track "$t_a$" of this recording plane is commenced, and then the data input operation to the data buffers 27a, 27b and 27c to be entered is commenced (a step 901). Subsequently, a check is made to determine whether or not the heads corresponding to the substitution tracks "$T_{30}$ to "$T_{3N}$" have not yet been used for preparing the data writing operation to the substitution sector within the substitution range allocated to the write range (a step 902). If the head has not yet been used, the head 32 for this substitution track 601b is selected and commenced to be positioned to the track ($t_m$) to be accessed within the substitution range which has been allocated to the write range (a step 903). If the head corresponding to the substitution tracks $T_{30}$ to $T_{3N}$ is under use at the step 802, the process jumps over the process defined at the step 803.

Then, the process waits for the head positioning operation to the head track ($t_a$) in a data recording region (a step 904), and the initial values of the buffer within the control unit 24, corresponding to the writing head block are set in such a way that the track number "1"=a and the sector number "s"=c.

Then, a completion of the data writing operation to the buffer corresponding to this track ($t_j$) is performed (a step 906). When the writing operation is completed, the data are read from the data buffer corresponding to this track and the DRAW operation is commenced (a step 907). When the DRAW operations for the relevant track and sector have been completed (a step 908), a check is made of the ID part and data part of the sector for this track (a step 909).

This operation is repeated until the final sector of the relevant track (steps 911 and 912), and furthermore, the operation with the same sequence is performed until the final sector of the final writing track (steps 914 and 916).

Figure 10B:
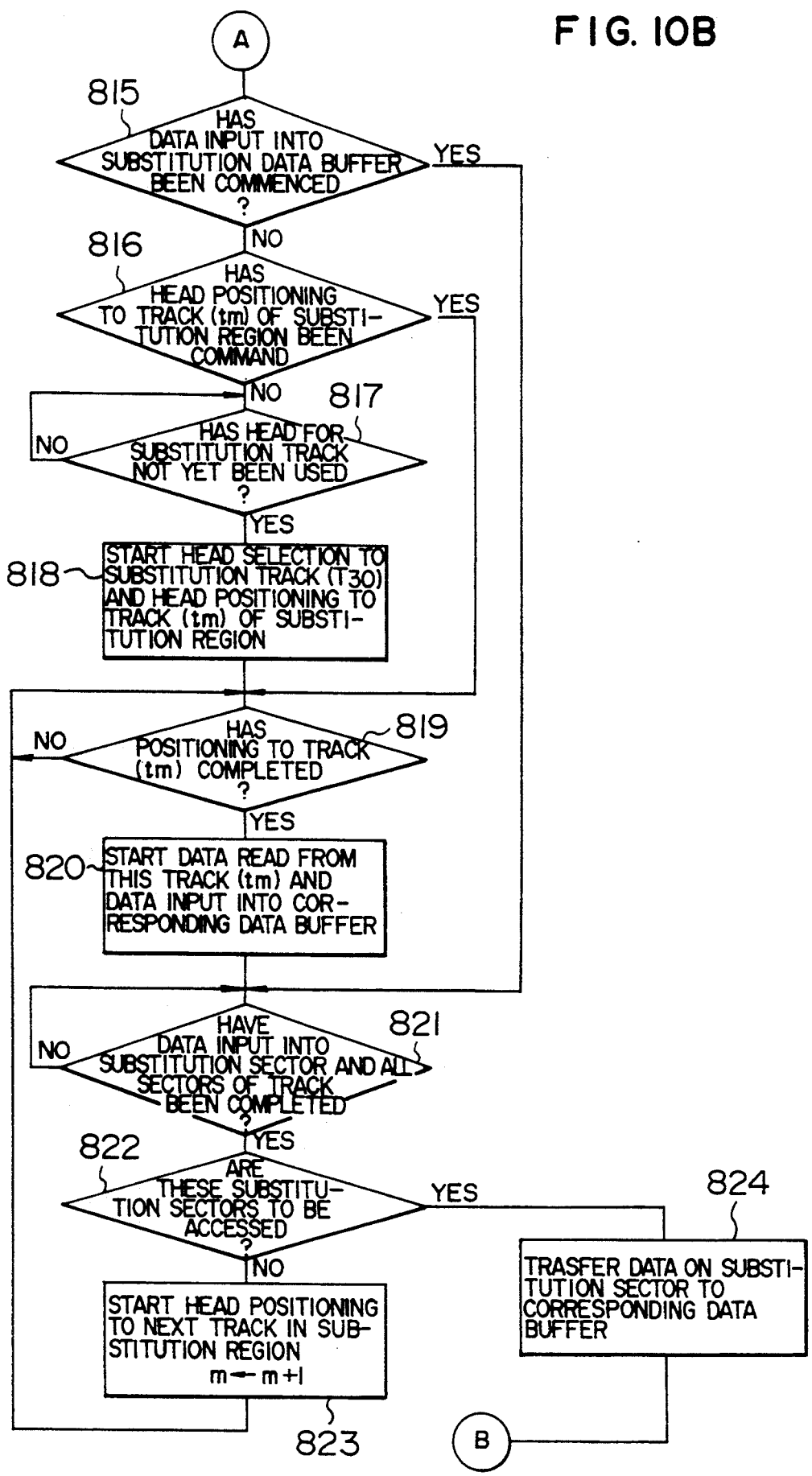

In case when the checked sector is recognized as the failed sector at the checking step 909 (a step 910), the data corresponding to this failed sector are moved to the data buffer for the substitution track (a step 913), and after the above-described writing sequence is repeated until the final sector of this track, the process is advanced from the step 914 to a loop for processing a failed sector represented in FIG. 10B.

At the step 903 for the initial stage of the writing operation, a judgement is made as to whether or not the head positioning operation to the substitution region within tracks "$T_{30}$" to "$T_{3N}$" has been commenced (a step 917). If the head positioning operation has not yet been performed, another check is made whether or not the head for the substitution track has not yet been used.

If this head is under use, the process waits until use of this head is ended (step 918).

Both the head selection of the substitution tracks $T_{30}$ to $T_{3N}$, and also the head positioning operation to the track ($t_m$) of the substitution region are commenced (a step 919). When this head positioning operation has been completed (a step 920), the data reading operation of this track ($t_m$) and also the data input operation to the corresponding data buffer are commenced (step 921). When all of the sectors have been inputted into the relevant all tracks ($t_m$) (at a step 922), a check is made if there is a non-used substitution sector (step 923), and if the non-used substitution sector is not present, positioning to track ($t_{m+1}$) next to the substitution sector is started (step 924) and returns to step 920. If the non-used substitution sector is found in step 923, both the data readout operation from the substitution data buffer and the writing and DRAW operations to the substitution sectors are commenced (step 925).

When the DRAW operations have been completed at all of the substitution sectors (a step 926), and also it can be judged that all of the data writing operations have been accomplished (a step 915), this writing operation is ended. If a "YES" judgement is made in step 927, the following non-used substitution sector is searched, then re-writing and DRAW operations are carried out. Until all the substitution sector is written without failure, the above operation is repeated.

As previously described, in case that the data transfer direction during the data writing operation is opposite to that of the data read operation, and the failed sector is detected by the DRAW operation during the data writing operation, the data are transferred from the corresponding data buffer to the substitution data buffer, and the above-described substitution sector is written by the data, while waiting for only the rotation of the relevant substitution track, so that there is no need to wait for the useless rotation of the recording medium and also no useless head positioning operation is required, which is similar to the advantages enjoyed by the data reading operation.

Although the present invention has been described by concretely explaining the various preferred embodiments, the present invention is not limited to the above-described preferred embodiments, but may be modified without departing from the technical spirit and scope of the invention.

The track formats, for instance, in the rotary type information recording medium are not restricted to those disclosed in the above-described preferred embodiments. Also, as the rotary type information recording medium, not only optical disks, but also magnetic disks may be employed.

In accordance with the rotary type information storage apparatus of the above-described preferred embodiment, since the substitution tracks where the substitution sectors are recorded on the specific recording plane are solely arranged, when these substitution tracks are accessed by a plurality of heads in cylinder units, the substitution sectors present in the same position of the plural information tracks belonging to the same cylinder in the circumferential direction with respect to the plural sectors are arranged just after the sectors within the substitution tracks, so that when the reading operation and writing operation are simultaneously executed for the sectors present at the same positions of the plural information tracks belonging to the same cylinder, the data transfer operations during both the data reading and writing operations, including the substitution process, can be quickly carried out with a relatively short waiting time for only 1 sector rotation, and also the information recording/reproducing operations with respect to the rotary type information recording medium can be performed at a higher efficiency.

Furthermore, in the preferred embodiment in which the positioning operations of the plural heads corresponding to the respective recording planes are separately performed, the data reading operation or the data writing operation is performed in the parallel mode for a plurality of information tracks, and also the access operation to the substitution sector corresponding to the failed sector within this information track is performed in connection with the head positioning operations for the recording plane where the substitution tracks are solely arranged, whereby the data transfer operations during the data reading and writing operations may be performed (including the substitution process) in a relatively short waiting time.

As a result, the data transfer operations among a plurality of high order apparatuses and a plurality of information tracks may be parallel-carried out, including the access operation to the substitution sector in asynchronism therewith, and thus the information multiple recording/reproducing operations with respect to the rotary type information recording medium may be effectively executed.

Also, according to the control method of the rotary type storage apparatus of the preferred embodiment, since the data transfer operations are performed among a plurality of information tracks and the plural data buffers in the parallel mode, when, for example, the positioning operations of the plural heads are performed in units of and cylinder, the data may be totally recorded/reproduced with respect to a plurality of sectors present at the same position of the respective information tracks belonging to the relevant cylinder in the circumferential direction. Moreover, since the substitution tracks on which the substitution sectors of the specific recording plane are recorded are solely allocated, the substitution process for substituting the data on the failed sector by the data on the substitution sector recorded on the relevant substitution track, may be executed at high speed without producing the useless waiting time, so that the data transfer operation including the substitution process during the data reading operation and the data writing operation may be quickly performed and the information recording/reproducing operations to the rotary type information recording medium may be effectively executed.

In case that the positioning controls for a plurality of heads which are arranged on the respective recording planes are independently formed with respect to each other, both the access operation to the information track on which the normal data have been recorded and the access operation to the substitution track on which the substitution sectors have been recorded may be performed in the parallel mode.

As a result, even when a failed sector happens to occur, the access operation to the substitution sector is performed without transporting the head under access operation to this failed sector. Also, in the data buffer, the data recorded on the failed sector are replaced by the data recorded on the substitution sector, so that the data transfer operations including the substitution process may be effectively performed among a plurality of information tracks and a plurality of high order apparatuses in the parallel mode and in asynchronism therewith under no waiting time for the useless rotation of the rotary type recording medium.

We claim:

1. A rotary type storage apparatus, comprising:
    a rotary type storage medium to which a plurality of concentric or spiral information tracks are set, and having a plurality of information recording planes in which each of said plurality of information tracks is subdivided into a plurality of sectors in a circumferential direction;
    a plurality of read/write heads provided with each or said information recording planes and for accessing said information tracks; and
    a head drive mechanism for controlling positioning operations of said plurality of read/write heads to said information tracks;
    at least one of said plurality of information recording planes being used as a recording plane for allotting substitution information tracks provided with a substitution sector corresponding to a failed sector present on another information recording plane;
    wherein said head drive mechanism is a single head drive mechanism; said plurality of read/write heads are simultaneously positioned to a cylinder constructed of a group of the information tracks positioned at the same position of said plural information recording planes in a radial direction thereof by way of said single head drive mechanism, whereby in a group of said information tracks belonging to said cylinder, the information read/write operations for said plurality of sectors present at the same position along a circumferential direction are performed at the same time; and said substitution sector is arranged at a subsequent sector position with respect to said plurality of sectors which are present at the same position along the circumferential direction in the substitution information track belonging to the same cylinder.

2. A rotary type storage apparatus as claimed in claim 1, wherein said head drive mechanism corresponds to a plurality of separate head drive mechanisms independently employed with said plurality of read/write heads, which independently position each of said plurality of read/write heads to both said plurality of information tracks and substitution tracks.

3. A method for controlling a rotary type storage apparatus including a rotary type storage medium to which a plurality of concentric or spiral information tracks are set and having a plurality of information recording planes in which each of said plurality of information tracks is subdivided into a plurality of sectors in a circumferential direction; a plurality of read/write heads provided with each of said information recording planes and for accessing said information tracks, and a head drive mechanism for controlling positioning operations of said plurality of read/write heads to said information tracks, at least one of said plurality of information recording planes being used as a recording plane on which substitution information tracks are allotted, in which a substitution sector corresponding circumferentially to a failed sector on another information recording plane is provided, comprising the steps of:
    controlling, via said head drive mechanism, said plurality of read/write heads to be positioned to readout starting sectors positioned at the same position within the same cylinder of said plural information recording planes;
    sequentially reading block contents of the sectors at said same position into said plurality of data buffers;
    judging, during the reading sequence, whether or not the block contents read into said plurality of data buffers correspond to data on a failed sector;
    if the block contents within said data buffers correspond to a normal sector, transferring the block contents externally in the order of the read blocks; and,
    if the block contents within said data buffers correspond to the failed sector, reading out and transferring via said read/write heads a block content of a sector positioned preceding to said substitution information track by one sector.

4. A method for controlling a rotary type storage apparatus as claimed in claim 3, wherein:
    said plurality of read/write heads are controlled to be positioned to a plurality of write starting sectors positioned at the same position within the same cylinder of said plural information recording planes;
    while the data written into said buffers are written by said plurality of read/write heads in the order of the plural sectors, a reading check is performed with respect to said plurality of sectors; and,
    if the failed sector is detected in said plurality of sectors, then the content of said plural data buffers corresponding to said failed sector is written into a sector positioned preceding to said substitution information track by one sector by said plurality of read/write heads.

5. A method for controlling a rotary type storage apparatus as claimed in claim 3, wherein:
    said drive mechanism corresponds to a plurality of separate head drive mechanisms independently employed with said plurality of read/write heads, which independently position each of said plurality of read/write heads to both said plurality of information tracks and substitution tracks;
    one of said plural read/write heads corresponding to said information recording planes is controlled to be positioned to an arbitrary read sector position of said plural information recording planes, and one of said plural read/write heads corresponding to the recording plane to which said substitution information track has been set is controlled to be positioned to said substitution sector corresponding to said read sector; and,
    when said substitution sector is allocated, a block of said allocated substitution sector is read out to one of said plurality of data buffers.

6. A method for controlling a rotary type storage apparatus as claimed in claim 5, wherein:
    write data externally supplied are written into one of said plurality of data buffers corresponding to a predetermined write sector; and
    one of said plural read/write heads corresponding to said predetermined data buffer is controlled to be positioned to the write sector, and one of said plural read/write heads corresponding to the recording plane to which said substitution track is set is controlled to be positioned to said substitution sector corresponding to said write sector.

* * * * *